United States Patent [19]

Fuchs, Jr.

[11] E Re. 28,795

[45] Reissued May 4, 1976

[54] APPARATUS AND METHOD FOR CONTINUOUS EXTRUSION

[75] Inventor: Francis Joseph Fuchs, Jr., Princeton, N.J.

[73] Assignee: Western Electric Company, Inc., New York, N.Y.

[22] Filed: Jan. 4, 1974

[21] Appl. No.: 430,984

Related U.S. Patent Documents

Reissue of:

[64] Patent No.: 3,740,985
Issued: June 26, 1973
Appl. No.: 199,542
Filed: Nov. 17, 1971

[52] U.S. Cl. ..... 72/60; 72/270; 72/284; 226/172

[51] Int. Cl.[2] ..... B21C 33/00

[58] Field of Search ..... 72/60, 45, 270, 42, 72/284, 422, 377; 226/172

[56] References Cited

UNITED STATES PATENTS

| | | | |
|---|---|---|---|
| 524,509 | 8/1894 | Robertson | 72/60 |
| 1,321,729 | 11/1919 | Friel | 72/422 |
| 2,569,266 | 9/1951 | Thompson | 72/422 |
| 2,598,190 | 5/1952 | Offutt | 72/422 |
| 2,602,538 | 7/1952 | Bimba et al. | 72/42 |
| 2,642,280 | 6/1953 | Fisk | 226/172 |
| 3,013,451 | 12/1961 | Scribner | 72/377 |
| 3,417,589 | 12/1968 | Bobrowsky | 72/60 |
| 3,618,840 | 11/1971 | Courret | 226/172 |
| 3,765,216 | 10/1973 | Green | 72/263 X |

FOREIGN PATENTS OR APPLICATIONS

| | | | |
|---|---|---|---|
| 487,791 | 12/1953 | Italy | 72/286 |
| 740,900 | 11/1955 | United Kingdom | 72/377 |
| 176,229 | 11/1965 | U.S.S.R. | 72/60 |

*Primary Examiner*—Milton S. Mehr
*Attorney, Agent, or Firm*—A. S. Rosen; D. P. Kelley

[57] ABSTRACT

Four trains of gripping element quadrants are continuously propelled around four endless paths, meeting along one length of travel common to the four paths and cooperating along said common length of travel to form a continuously moving train of centrally apertured gripping elements moving toward an extrusion die adjacent the end of said common length of travel. Rod of indefinite length, coated with shear transmitting medium and extending into the central apertures of the gripping elements, is drawn along the common length of travel by means of shear forces generated in said coating by said gripping elements and transmitted to said rod as viscous drag force along the surface of the rod. Axial and normal stresses are built up in the rod to stress the rod far above its yield strength and increase its ductility, or capacity for deformation without fracture. In this state, the rod is moved through and deformed by the die. A pressure cylinder surrounds the gripping elements along the common length of travel and provides balanced increasing lateral support to the gripping elements as they move toward the die.

97 Claims, 10 Drawing Figures

INVENTOR.
FRANCIS J. FUCHS JR.
BY Jack Schurr
ATTORNEY

INVENTOR.
FRANCIS J. FUCHS JR.
BY Jack S. Lerman
ATTORNEY

INVENTOR.
FRANCIS J. FUCHS JR.
BY Jack Schumer
ATTORNEY

INVENTOR.
FRANCIS J. FUCHS JR.
BY Jack Schwarz
ATTORNEY

INVENTOR.
FRANCIS J. FUCHS JR.
BY Jack Schumann
ATTORNEY

INVENTOR.
FRANCIS J. FUCHS JR.
BY Jack Schuman
ATTORNEY

INVENTOR.
FRANCIS J. FUCHS JR.
BY Jack Schuman
ATTORNEY

INVENTOR.
FRANCIS J. FUCHS JR.
BY Jack Schuman
ATTORNEY

APPARATUS AND METHOD FOR CONTINUOUS EXTRUSION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates, broadly speaking, to apparatus and method for continuous steady extrusion. More specifically, this invention relates to apparatus and method for continuously applying force along a portion of the surface of a rod of indefinite length to continuously advance the rod through an extrusion die.

2. Description of the Prior Art

Representative are showing the more-or-less continuous deformation of rod appears in the following patents and certificate: U.S. Pat. No. 2,642,280 (1953) to Fisk; U.S. Pat. No. 2,696,907 (1954) to Fisk; U.S. Pat. No. 2,736,425 (1956) to Fisk; U.S. Pat. No. 3,113,676 (1963) to Harkenrider; U.S. Pat. No. 3,415,088 (1968) to Alexander et al.; U.S. Pat. No. 3,417,589 (1968) to Bobrowsky; U.S. Pat. No. 3,423,983 (1969) to Lees et al.; U.S. Pat. No. 3,434,320 (1969) to Green; U.S. Pat. No. 3,440,849 (1969) to Hardy et al.; U.S. Pat. No. 3,449,935 (1969) to McAllan; U.S. Pat. No. 3,526,115 (1970) to Armstrong et al.; U.S.S.R. Author's Certificate 176,229 (1966) to Shvarzburd.

In my copending application Ser. No. 876,940, filed Nov. 14, 1969, and entitled "Apparatus and Method for Continuous Material Feeding and Deformation," there is shown apparatus and method for the continuous steady extrusion of rod of indefinite length, employing the viscous drag force of viscous fluid circuits, portions of which flow along the surface of the rod to build up stresses in the rod and advance the rod through an extrusion die. The disclosure of my copending application, Ser. No. 876,940, represents a milestone in the long history of the art of extrusion as theretofore known.

The present invention represents yet a further improvement in the art of extrusion.

SUMMARY OF THE INVENTION

One of the objects of this invention is to provide improved apparatus and method for the continuous deformation of an elongated workpiece of indefinite length.

Another of the objects of this invention is to provide improved apparatus and method for the continuous and steady extrusion of a rod of indefinite length to produce wire of indefinite length.

A further object of this invention is to provide improved apparatus and method for continuously applying force along a portion of the surface of a rod of indefinite length to build up stresses in the rod and to continuously and steadily advance the rod through an extrusion die.

Still other and further objects of this invention will become apparent during the course of the following description and by reference to the accompanying drawings and the appended claims.

Briefly, I have discovered that the foregoing objects may be attained by providing, in the preferred embodiment, four endless paths, each of said paths guiding a train or series of segments, each segment having gear teeth on the outer surface and having an inner configuration corresponding with the configuration of a quarter of the surface of the rod. Each train or series of segments is driven around its respective path by rotating spur gears, the said paths and their respective series of segments converging about the rod at a station upstream of an extrusion die and diverging at a station downstream of the extrusion die. The segments converged about the rod and being driven from the upstream station toward the downstream station apply a motive force along the surface of a shear transmitting medium which has been applied to the surface of the rod upstream of the upstream station and which shear transmitting medium is interposed between the inner surfaces of the segments and the rod surface, which shear transmitting medium in turn exerts viscous drag force along the surface of the rod to propel the rod through the extrusion die.

BRIEF DESCRIPTION OF THE DRAWING

Referring now to the drawings, in which like numerals represent like parts in the several views.

DESCRIPTION OF THE PREFERRED EMBODIMENT

Figure 1:
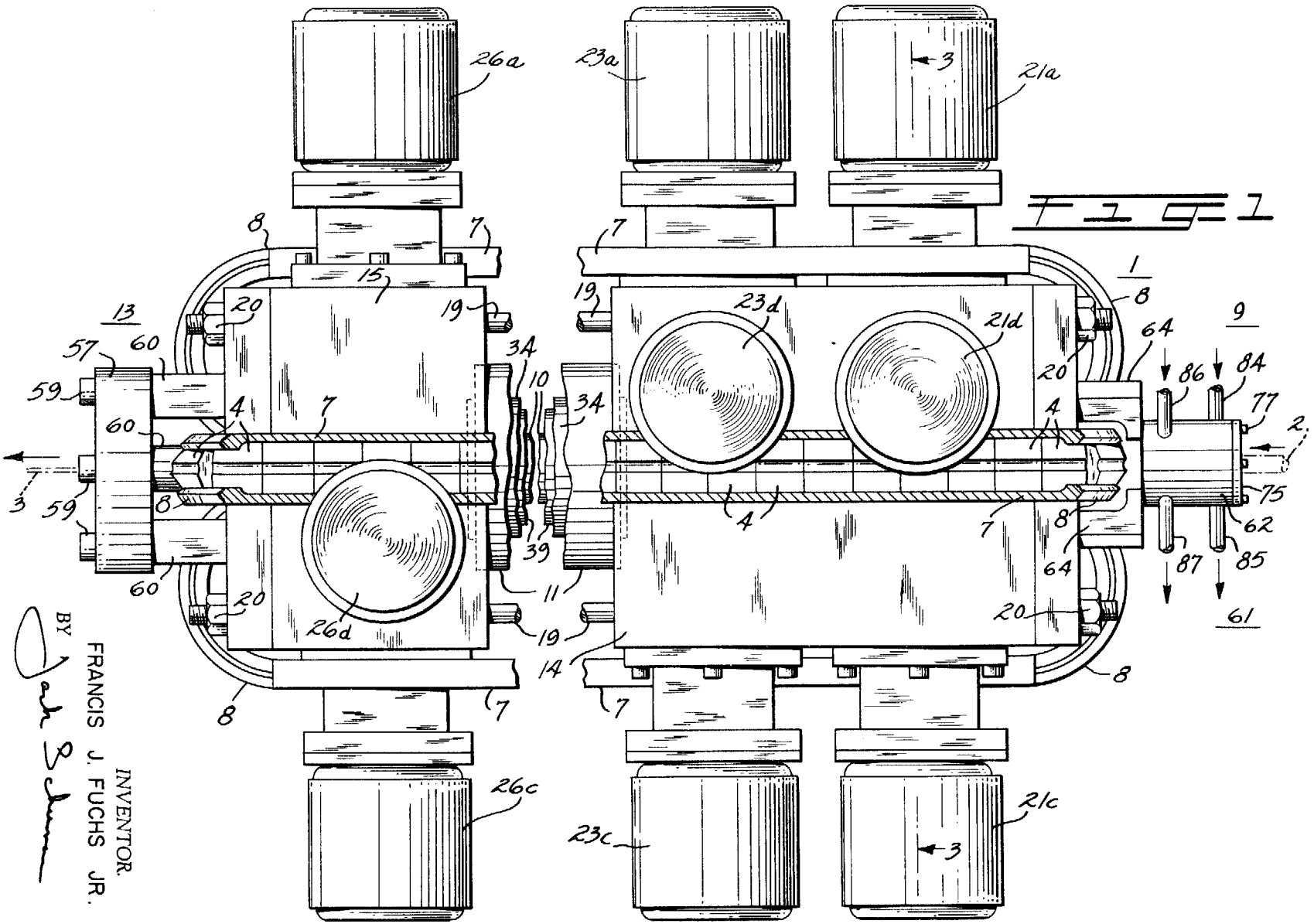
FIG. 1 represents a longitudinal view in elevation of the apparatus of the present invention, partially broken away to show certain internal features of construction, the rod entering the apparatus at the right being shown in phantom and the wire exiting the machine at the left likewise being shown in phantom.
Figure 2:
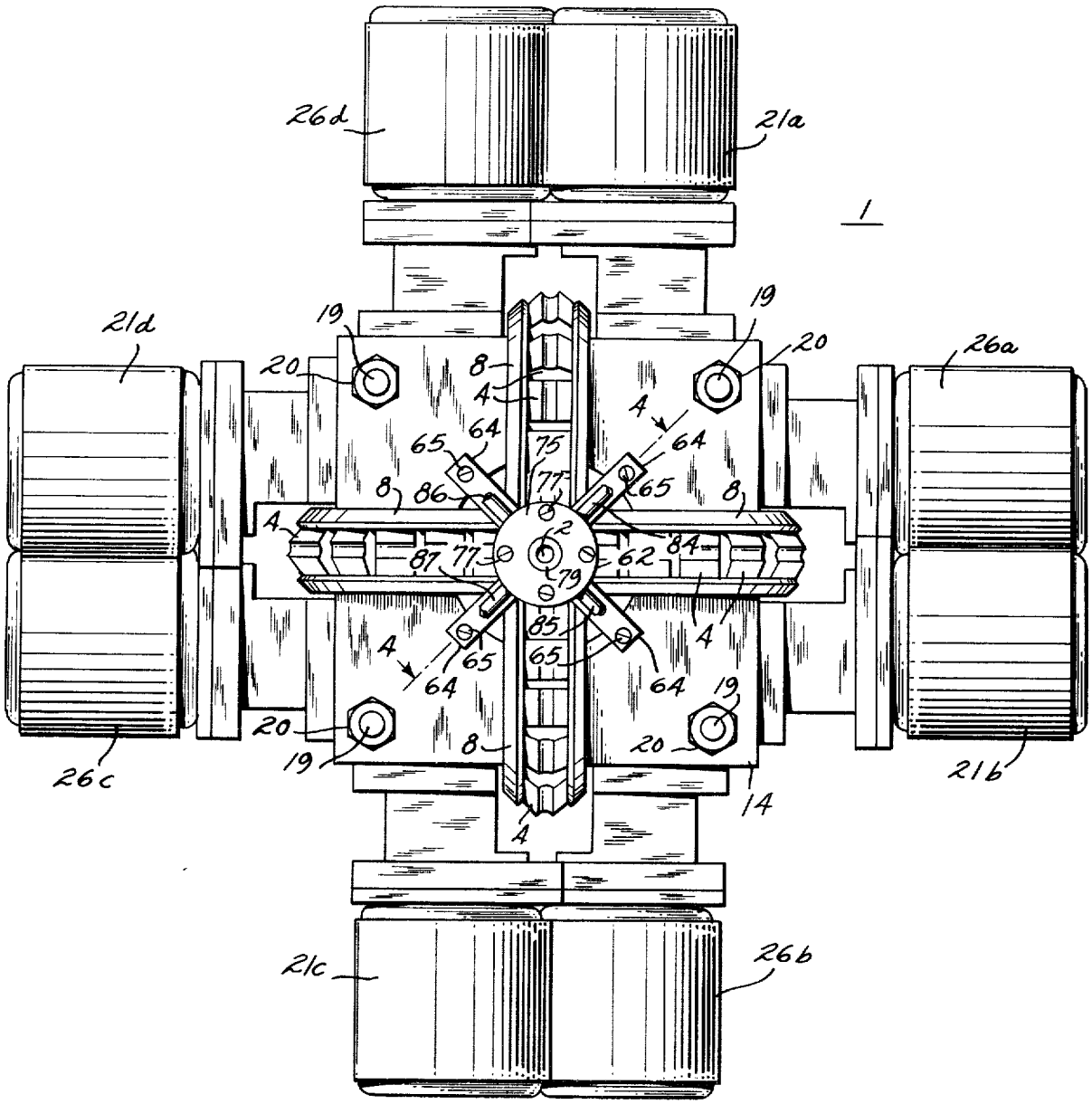
FIG. 2 represents a transverse view in elevation of the apparatus of the present invention, taken from the right of FIG. 1.

Extrusion apparatus 1, for the continuous and steady extrusion of rod 2 of indefinite (i.e., unrestricted) length to form wire 3 likewise of indefinite (i.e., unrestricted) length is seen, in a broad overview, as comprising four groups or trains of gripping element quadrants 4, the gripping element quadrants 4 of each group or train being driven by a pinion gear 5a, 5b, 5c and 5d and by a pinion gear 25a, 25b, 25c and 25d around an endless path 6 defined in part by straight lengths 7 of track and curved sections 8 of track. The paths of the four groups or trains of gripping element quadrants 4 converge about rod 2 at the entrance end 9 of the apparatus 1, four gripping element quadrants 4, one from each group or train, cooperating to form a gripping element 10 encircling a portion of the surface of rod 2 (e.g., a length of rod 2 corresponding to the length of gripping element 10) whereby to move, in a manner to be described hereinafter, rod 2 through pressure cylinder 11 and extrusion die 12, the wire 3 resulting from the extrusion operation appearing at exit end 13 of apparatus 1, and the cooperating gripping element quadrants 4 diverging past (i.e., downstream of) extrusion die 12 and proceeding thence along their respective separate paths 6. It will be seen, further, that gripping elements 10 in series between the entrance end 9 and exit end 13 in effect constitute an endless pressure chamber about the length of rod 2 in the apparatus 1.

Having given this broad overview, the apparatus 1 will now be described in greater detail.

Gear blocks 14 and 15 are provided with central bores 16 and 17, respectively, and are counterbored slightly in their facing sides to receive the ends of pressure cylinder 11 having a central bore 18. Gear blocks 14 and 15 and pressure cylinder 11 are securely held in assembled relation, with the longitudinal axes of bores 16, 17 and 18 aligned by means of tie rods 19 extending completely through the said gear blocks 14 and 15 and tensioned by means of nuts 20 threaded on the ends of the said tie rods 19 sufficiently to bear on the far sides of gear blocks 14 and 15, as shown in FIG. 1.

Figure 3:
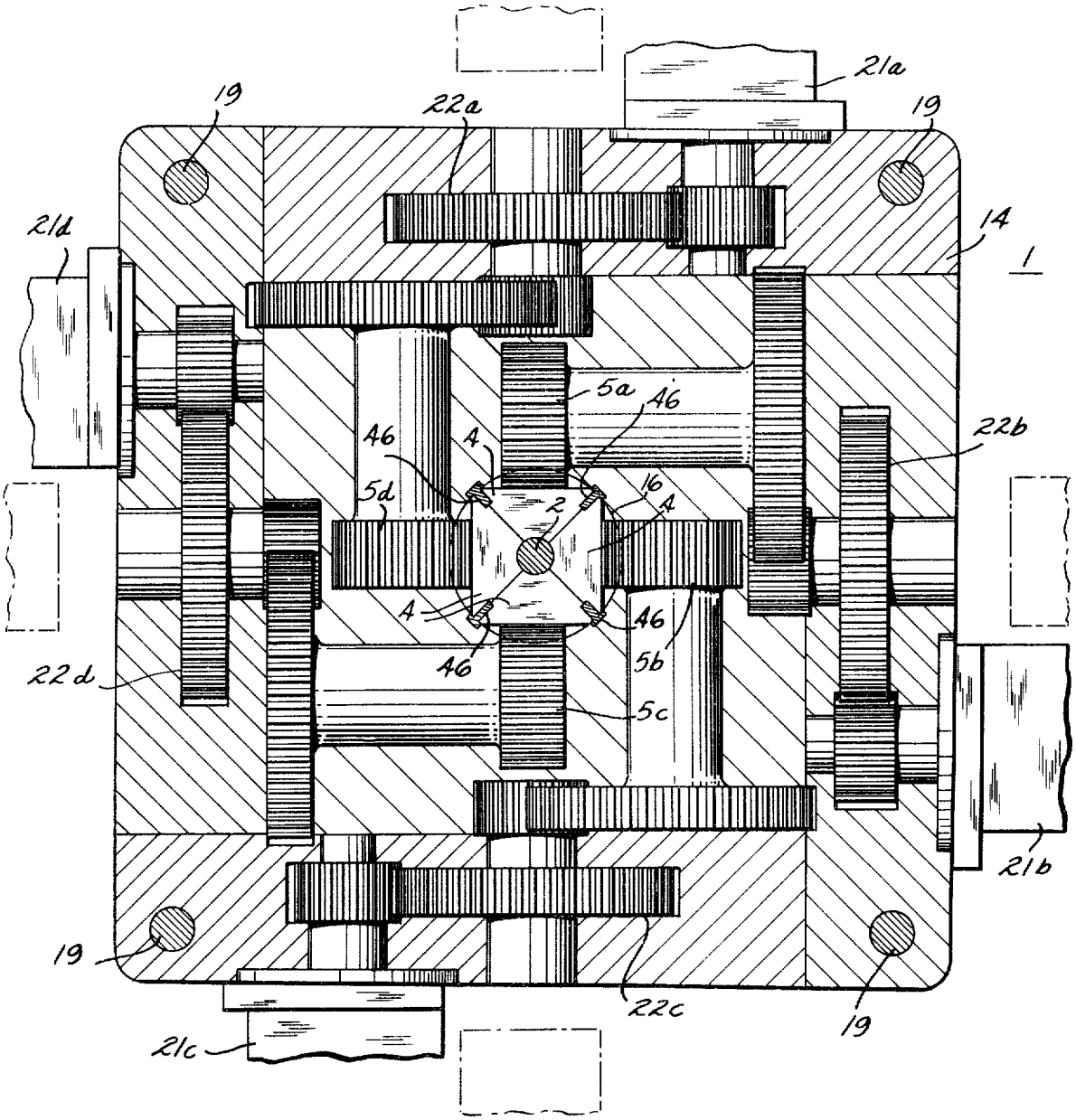
FIG. 3 represents a transverse section taken along the line 3—3 of FIG. 1.

Mounted to gear block 14, around that portion of gear block 14 adjacent the entrance end 9 of apparatus 1, are four fluid motors 21a, 21b, 21c and 21d preferably driven in unison from a common supply of pressurized motive fluid (not shown). Fluid motors 21a, 21b, 21c and 21d are arranged about the four faces of gear block 14 so as to occupy positions 90° removed from each other, when the apparatus 1 is viewed from an end thereof. Each fluid motor 21a, 21b, 21c and 21d drives a gear train 22a, 22b, 22c and 22d, respectively, suitably mounted and arranged within gear block 14 as shown in FIG. 3, and each gear train 22a, 22b, 22c and 22d drives a pinion gear 5a, 5b, 5c and 5d, the teeth of which extend into central bore 16 at positions 90° removed from each other as shown in FIG. 3. Mounted to gear block 14, around that portion of gear block 14 adjacent pressure cylinder 11, are four fluid motors 23a, 23b, 23c and 23d, preferably driven in unison from a common supply of pressurized fluid (not shown). Fluid motors 23a, 23b, 23c and 23d are arranged about the four faces of gear block 14 so as to occupy positions 90° removed from each other, when the apparatus 1 is viewed from an end thereof. Each fluid motor 23a, 23b, 23c and 23d drives a gear train 24a, 24b, 24c and 24d, respectively, suitably mounted and arranged within gear block 14, in a manner similar to the mounting and arrangement of gear trains 22a, 22b, 22c and 22d shown in FIG. 3. Each gear train 24a, 24b, 24c and 24d drives a pinion gear 25a, 25b, 25c and 25d, the teeth of which extend into central bore 16 at positions 90° removed from each other.

Mounted to gear block 15 are four fluid pumps 26a, 26b, 26c and 26d. Fluid pumps 26a, 26b, 26c and 26d are arranged about the four faces of gear block 15 so as to occupy positions 90° removed from each other, when the apparatus 1 is viewed from an end thereof. Each fluid pump 26a, 26b, 26c and 26d is driven by a gear train (not shown) suitably mounted and arranged within gear block 15 in a manner similar to the mounting and arrangement of gear trains 22a, 22b, 22c and 22d shown in FIG. 3, each said gear train being driven by a pinion gear 27a, 27b, 27c and 27d, the teeth of which extend into central bore 17 at positions 90° removed from each other.

It is the function of pinion gears 5a, 5b, 5c and 5d, and of pinion gears 25a, 25b, 25c and 25d, engaging the teeth of and driving gripping element quadrants 4 in the groups or trains thereof upstream from pressure cylinder 11, when operated, preferably in unison, by supplying their respective fluid motors 21a, 21b, 21c and 21d, and their respective fluid motors 23a, 23b, 23c and 23d with pressurized fluid from the source (not shown), to advance the said trains of gripping element quadrants 4 through the pressure cylinder 11 from the inlet or upstream end thereof toward the exit or downstream end thereof and thence around the several endless paths 6.

It is the function of pinion gears 27a, 27b, 27c and 27d, engaging and being driven by the teeth of advancing gripping element quadrants 4 in the groups or trains thereof downstream from pressure cylinder 11, to act as brakes on the said moving trains of gripping element quadrants, working against pinions 5a, 5b, 5c and 5d, and against pinions 25a, 25b, 25c and 25d, and thereby hold together, in rigid juxtaposition within pressure cylinder 11 between the inlet and exit ends thereof, all gripping element quadrants 4 in the same group or train.

Conveniently, the intakes of fluid pumps 26a, 26b, 26c and 26d may be connected by conduits (not shown) to the respective discharge ports of fluid motors 23a, 23b, 23c and 23d, and the discharge ports of fluid pumps 26a, 26b, 26c and 26d may be connected by suitable conduits (not shown) to the source of pressurized fluid serving fluid motors 21a, 21b, 21c, 21d, 23a, 23b, 23c and 23d. In this manner, the work of operating fluid pumps 26a, 26b, 26c and 26d to pump fluid therethrough will effect the desired braking action on the gripping element guadrants 4 within pressure cylinder 11.

Figure 6:
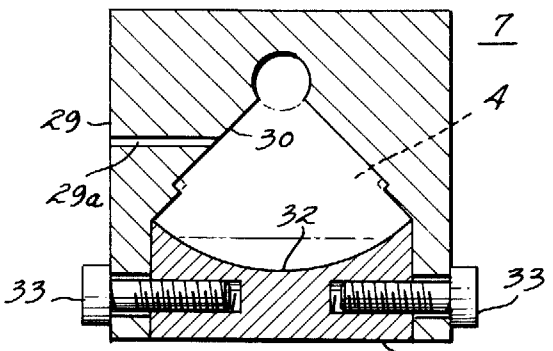
FIG. 6 represents a section taken along the line 6—6 of FIG. 5, showing certain track details.
Figure 7:
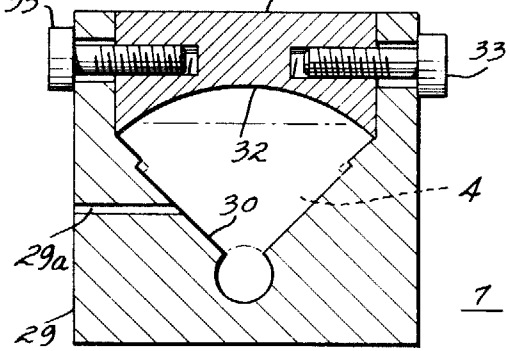
FIG. 7 represents a section taken along the line 7—7 of FIG. 5, showing certain track details.

It will be seen that four curved sections 8 of track are arranged at positions 90° removed from each other, when the apparatus is viewed transversely, at the exit end of central bore 17 of gear block 15, and that four curved sections 8 of track are arranged at positions 90° removed from each other, when the apparatus is viewed transversely at the inlet end of central bore 16 of gear block 14, and that the ends of said curved sections 8 of track at opposite ends of apparatus 1 are joined by straight sections 7 of track. Tracks 7, as shown in cross-section, particularly in FIGS. 6 and 7, comprise body portion 29 with quadrant-shaped longitudinal opening 30 receiving gripping element quadrants 4, retainer portion 31 having curved inner face 32 corresponding with the curved toothed exterior surface of gripping element quadrants 4, and threaded bolts 33 holding retainer portion 31 in place in body portion 29. Tracks 8 are of generally similar construction, receiving gripping element quadrants 4 and providing for a smooth transition in the paths 6 between straight sections 7 of track and central bores 16 and 17 of gear blocks 14 and 15.

Advantageously, gripping element guadrants 4 from the separate endless paths 6, which have met in that length of travel common to the said four endless paths 6 and therein constitute gripping elements 10, are maintained in closely abutting relation prior to and as they are engaged by pinions 5a, 5b, 5c and 5d, whereby to insure that they are properly engaged by the teeth of said pinions 5a, 5b, 5c and 5d and pass through pressure cylinder 11 without gaps therebetween. To compensate for the curved track sections 8 which, due to the configuration of gripping element quadrants 4, may cause gaps between adjacent gripping element quadrants 4 in certain portions of their respective endless paths 6, means are provided in each endless path 6 to urge the gripping element quadrants 4 in closely abutting relation, toward pinions 5a, 5b, 5c and 5d. Such means may, for example, comprise a transverse passage 29a in track 7 of each endless path 6, for the introduction of pressurized air between adjacent gripping element quadrants 4, thereby urging the gripping element quadrants 4, as they pass downstream of the conduit 29a against the train of gripping element quadrants 4 leading to pinions 5a, 5b, 5c and 5d.

Mounted within central bore 18 of pressure cylinder 11 is a sleeve 34 (FIG. 8) having an outer diameter such as to permit sleeve 34 to fit snugly within the said central bore 18. Sleeve 34 is somewhat longer than pressure cylinder 11 and projects from both ends thereof into the counterbores in the facing sides of gear blocks 14 and 15.

Figure 8:
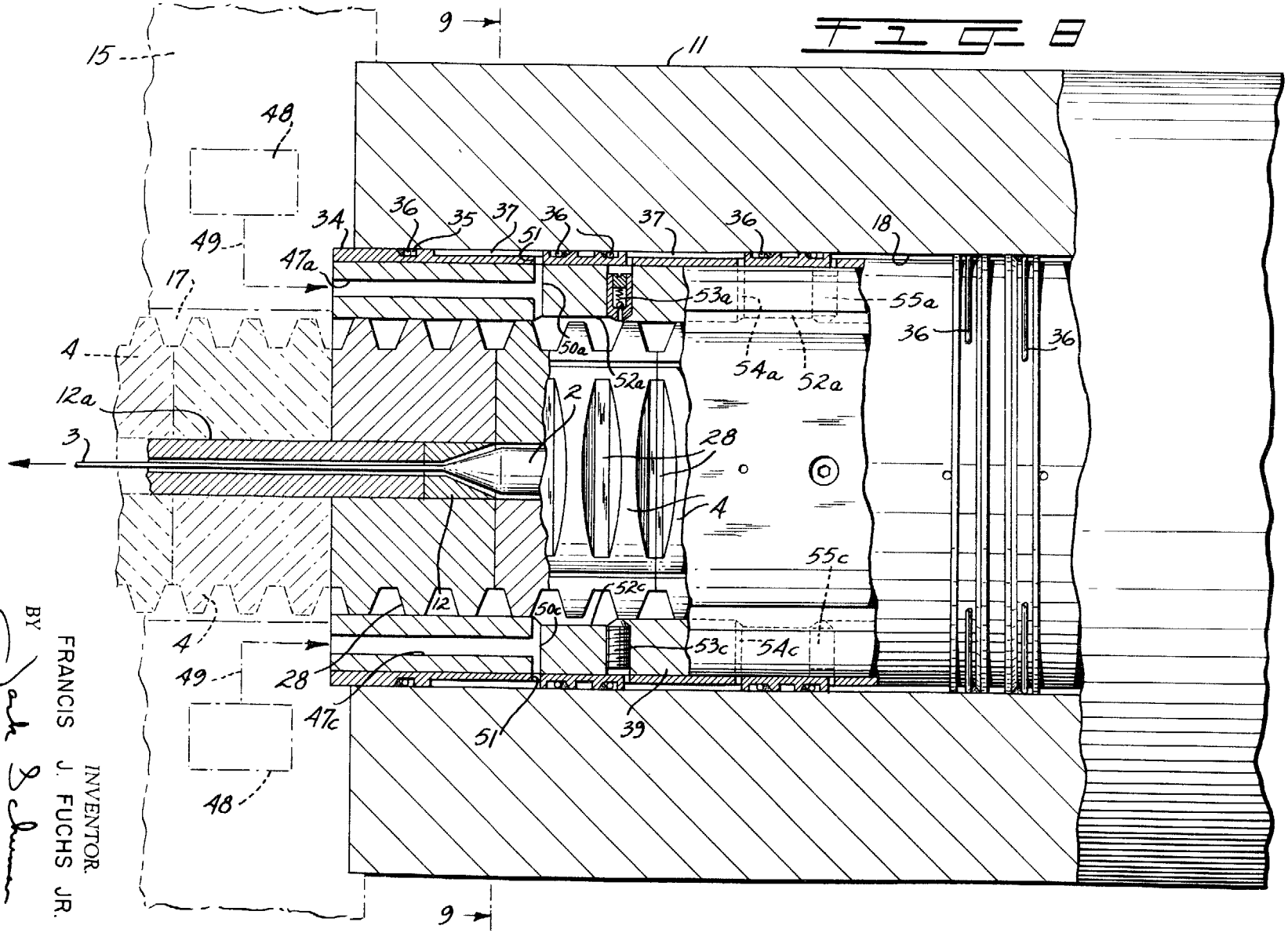
FIG. 8 represents a transverse medial section, partially broken away, of the pressure cylinder, showing the relationship of the extrusion die to the gripping elements closed about the rod.

The outer surface of sleeve 34 is undercut or reduced in diameter at spaced lengths therealong, as shown in FIG. 8, thereby to provide spaced pairs of seal seats 35 receiving sealing rings 36 except at the ends of sleeve 34 where only single seal seats 35 with sealing rings 36 are provided, and further to provide between the spaced pairs of seal seats 35 (and between the endmost pairs of seal seats 35 and the single seal seats 35 adjacent thereto) annular compartments 37. The center-to-center distance between spaced pairs of seal seats 35 (and between the endmost pairs of seal seats 35 and the single seal seats 35 adjacent thereto) is, in the preferred embodiment, equal to the length of a gripping element quadrant 4.

Figure 9:
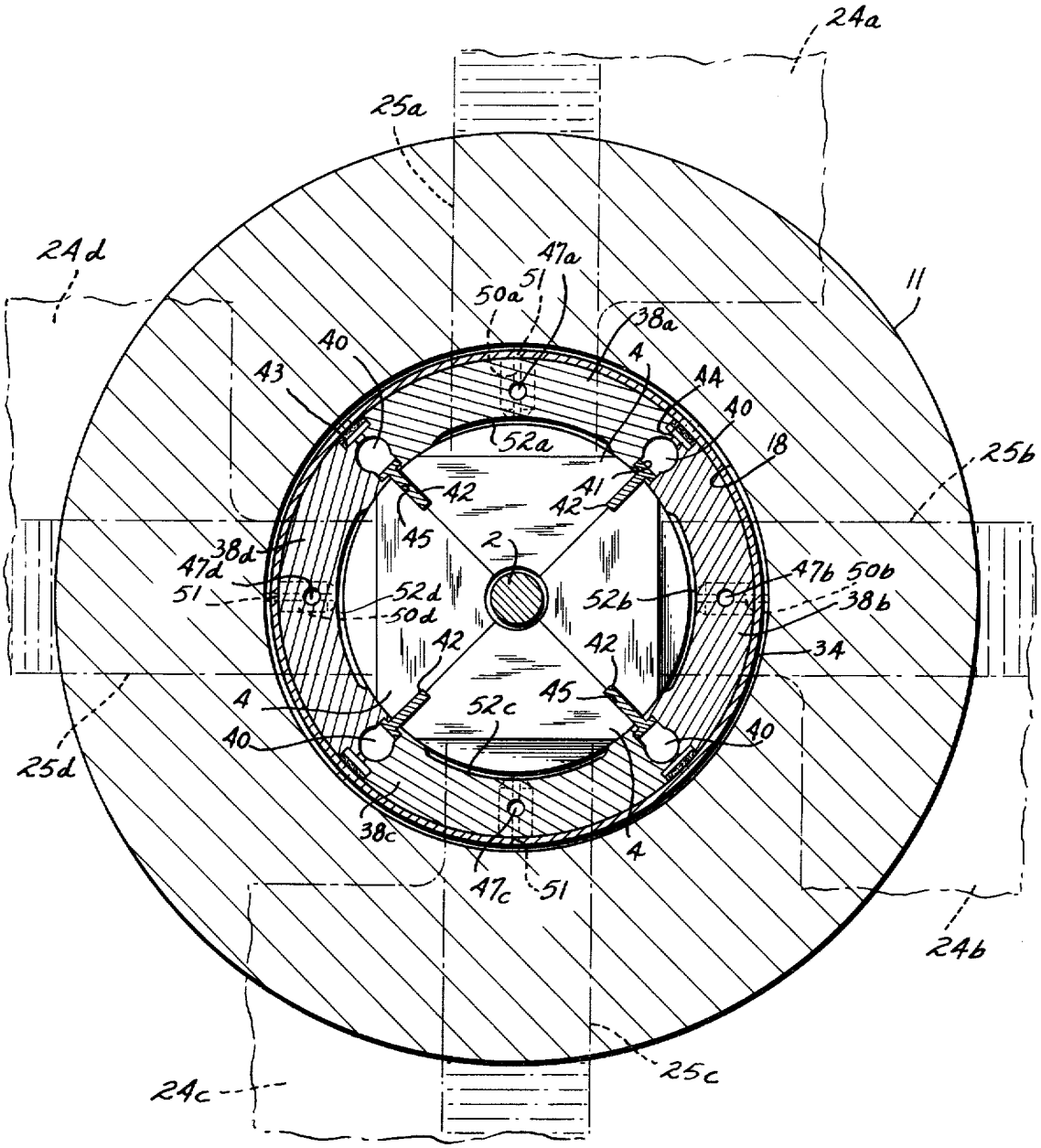
FIG. 9 represents a transverse section of the pressure cylinder taken along the line 9—9 of FIG. 8.
Figure 10:
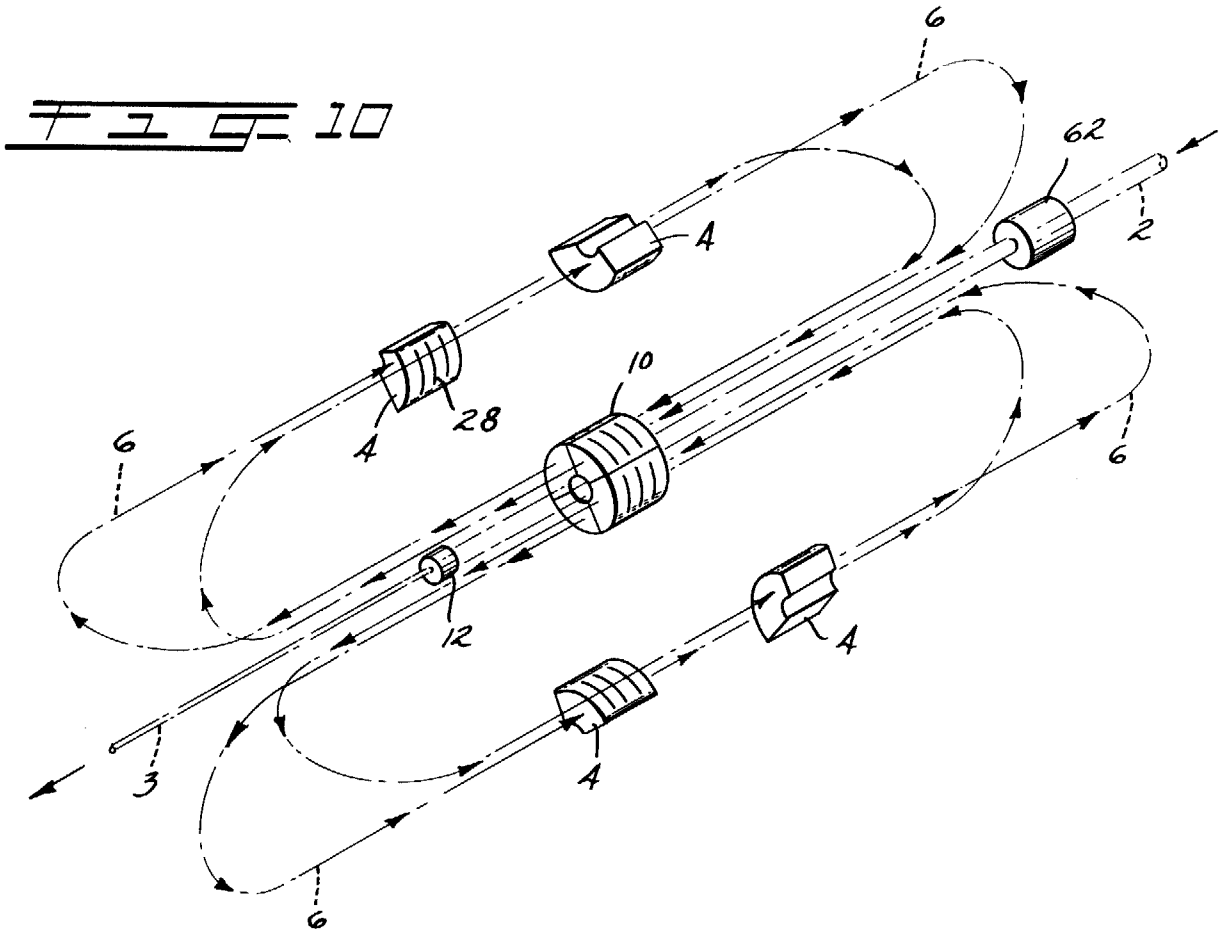
FIG. 10 represents a perspective diagrammatic view of the paths of the four sets of gripping elements relative to the rod and die, and illustrates the broad principle of operation of the present invention.

Four sleeve quadrants 38a, 38b, 38c and 38d, each occupying 90° of arc, are positioned within sleeve 34 and collectively constitute a second sleeve 39 of outer diameter substantially equal to the inner diameter of sleeve 34 (i.e., the second sleeve 39 closely fits within sleeve 34) and of length equal to the length of sleeve 34. The sides of sleeve quadrants 38a, 38b, 38c and 38d are recessed so as to provide, when the sleeve quadrants 38a, 38b, 38c and 38d are assembled, a longitudinal circular recess 40 adapted to receive an elongated heating element (not shown), a seat 41 adapted to receive guide member 42, and a seat 43 adapted to receive a sealing plate 44. It will be noted, from FIG. 9, that guide members 42 extend inwardly of sleeve 39 and are 90° removed from each other. Gripping element quadrants 4 are each provided, on the outer portions of their mating faces, with a slot 45, and guide members 42, extending into the slots 45 between engaged gripping element quadrants 4, as shown in FIG. 9, function to key the gripping element 10 constituted by the said gripping element quadrants 4 to prevent the same from rotating in passing longitudinally through pressure cylinder 11.

It will be noted that, as each gripping element quadrant 4 passes along that portion of its path 6 defined by tracks 7 and 8, the cross-section of tracks 7 and 8 prevent the gripping element quadrant 4 from rotating transversely to its direction of movement. Means are provided to key the gripping element quadrants 4 as they leave curved tracks 8 and enter central bore 16 of gear block 14 at the entrance end 9 of the apparatus 1. Means are also provided to key the gripping element quadrants 4 as they leave central bore 17 of gear block 15 and enter curved tracks 8 at the exit end 13 of apparatus 1. Such means comprises guide members 46 arranged and secured in radially spaced relation to each other (i.e., at 90° angles to each other) inside central bores 16 and 17 of gear blocks 14 and 15, respectively. Corresponding guide members 46 in central bores 16 and 17 are aligned with each other and with corresponding guide members 42 in pressure cylinder 11, and are suitably oriented with respect to curved tracks 8 so that, as the gripping element quadrants 4 leave curved tracks 8 at the entrance end 9 of apparatus 1, guide members 46 in central bore 16 will register with slots 45 in adjacent gripping element quadrants 4; further, as gripping element quadrants 4 leave central bore 17 to enter curved tracks 8 at the exit end 13 of apparatus 1, slots 45 between adjacent gripping element quadrants 4 will clear guide members 46 and the individual gripping element quadrants 4 will enter their respective curved tracks 8 smoothly.

In the foregoing manner, gripping element quadrants 4 are guided around the entire length of their respective endless path 6 (i.e., through track 7, track 8, central bore 16, pressure cylinder 11, central bore 17, track 8 and back to track 7).

Fluid passageways 47a, 47b, 47c and 47d are formed through the ends of sleeve quadrants 38a, 38b, 38c and 38d, respectively, midway between the sides thereof, and communicate with sources of pressurized fluid indicated diagrammatically by the numeral 48 through conduit 49. Fluid passageways 47a, 47b, 47c and 47d communicate, at their innermost ends with radial passageways 50a, 50b, 50c and 50d, respectively. The outer ends of radial passageways 50a, 50b, 50c and 50d communicate, through apertures 51 in sleeve 34, with endmost compartment 37, thereby to pressurize said endmost compartment 37 uniformly thereabout. This pressure is exerted, through sleeve 34 on sleeve quadrants 38a, 38b, 38c and 38d and thence on their respective gripping element guadrants 4, thereby forcing said gripping element quadrants inwardly and tightly about die 12 and die stem 12a.

The inner surfaces of sleeve quadrants 38a, 38b, 38c and 38d, opposite each of the pairs of sealing rings 36 and between guide members 42, are recessed at 52a, 52b, 52c and 52d, to provide a fluid passageway between said inner surfaces and teeth 28 of gripping element quadrants 4. Elsewhere, there is a close sliding fit between the inner surfaces of sleeve quadrants 38a, 38b, 38c and 38d and teeth 28.

The inner ends of radial passageways 50a, 50b, 50c and 50d communicate with adjacent recesses 52a, 52b, 52c and 52d thereby to introduce pressurized fluid therein, adjacent the downstream (relative to the direction of movement of gripping element quadrants 4) sides of said adjacent recesses 52a, 52b, 52c and 52d. Thus, the pressurized fluid acting upon the external surfaces of gripping element quadrants 4, forces said gripping element quadrants 4 inwardly and tightly about rod 2 immediately upstream of die 12.

Adjacent the upstream (relative to the direction of movement of gripping element quadrants 4) sides of said last mentioned recesses 52a, 52b, 52c and 52d are provided pressure reducing valves 53a, 53b, 53c and 53d, communicating between said last mentioned recesses 52a, 52b, 52c and 52d and the next compartment 37. Pressure reducing valves 53a, 53b, 53c and 53d are adapted to vent pressurized fluid from said last mentioned recesses 52a, 52b, 52c and 52d, when the pressure of the fluid therein rises above a predetermined value, to said next compartment 37 at a lower pressure and thereby maintain a predetermined difference in pressure between the higher-pressurized last mentioned recesses 52a, 52b, 52c and 52d and the lower-pressurized next compartment 37.

Radial passageways 54a, 54b, 54c and 54d communicate between the upstream side of the last mentioned compartment 37 and the downstream sides of the next recesses 52a, 52b, 52c and 52d, thereby introducing pressurized fluid from said compartment 37 to said recesses 52a, 52b, 52c and 52d. Because of pressure reducing valves 53a, 53b, 53c and 53d, the pressure in said recesses 52a, 52b, 52c and 52d against the exterior surfaces of gripping element quadrants 4 is less than the pressure against the exterior surfaces of those gripping element quadrants 4 immediately downstream.

Pressure reducing valves 55a, 55b, 55c and 55d communicate between the upstream sides of said last-mentioned recesses 52a, 52b, 52c and 52d and the next compartment 37, and are adapted to vent pressurized fluid from said recesses 52a, 52b, 52c and 52d, when the pressure of the fluid therein rises above a predetermined value, to said next compartment 37 at a lower pressure and thereby maintain a predetermined difference in pressure between the said higher-pressurized recesses 52a, 52b, 52c and 52d and the lower-pressurized next compartment 37. Pressure reducing valves 55a, 55b, 55c and 55d are operative to pass pressurized fluid therethrough at a lower pressure than pressure reducing valves 53a, 53b, 53c and 53d, and therefore the pressure against the exterior surfaces of gripping element quadrants 4 passing by the recesses 52a, 52b, 52c and 52d associated with the said pressure reducing valves 55a, 55b, 55c and 55d is less than against the exterior surfaces of those gripping element quadrants immediately downstream.

The same arrangement of radial passageways and pressure reducing valves is provided for all the compartments 37 and recesses 52a, 52b, 52c and 52d upstream of those just described (i.e., to the right of FIG. 8). The pressure reducing valves are operative to pass pressurized fluid therethrough at lower levels than the immediately downstream pressure reducing valves. In this manner, the exterior surfaces of gripping element quadrants 4 are subjected to a pressure gradient increasing in steps from the time the gripping element quadrants 4 enter the upstream end of pressure cylinder 11 (i.e., the right end thereof as viewed in FIG. 8) until at least the time the gripping element quadrants 4 pass over die 12.

Pressurized fluid from the upstream-endmost compartment 37 may be fed back to a suitable pump (not shown) for subsequent recycling to the sources 48 of pressurized fluid.

Figure 5:
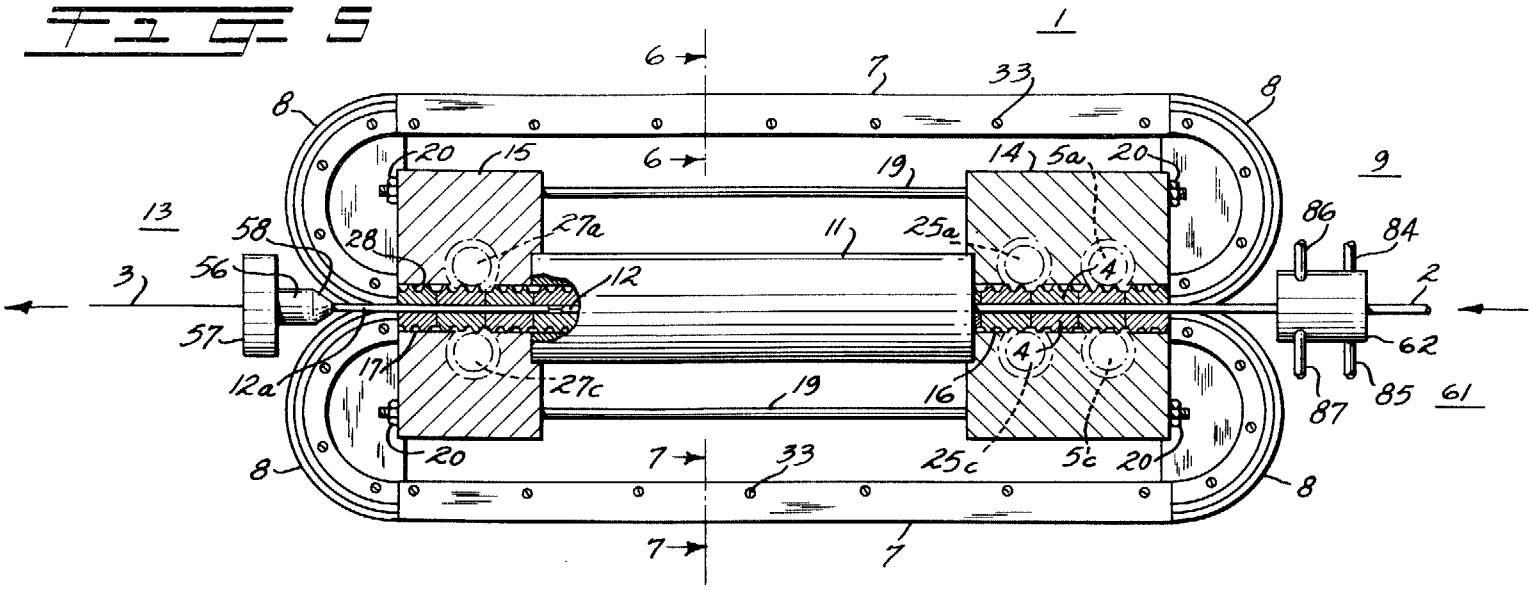
FIG. 5 represents a longitudinal view, partially in medial section and partially diagrammatic, of the apparatus of the present invention, with all but the last pinions of the several power trains omitted for purposes of simplifying the figure.

Die stem 12a extends downstream of gear block 15, past the point at which gripping element quadrants 4 enter their respective curved tracks 8 as they leave central bore 17, and extends through die stem support 56 into a counterbore in support plate 57. Die stem support 56, secured to support plate 57, has a tapered nose 58 permitting it to extend closely between the diverging curved tracks 8 (FIG. 5) and thereby give effective lateral support to die stem 12a. Bolts 59, extending through support plate 57 and spacers 60, are threaded into the downstream side of gear block 15. In this manner, die 12 is securely supported against the thrust of rod 2.

Apparatus 61 for sizing and coating rod 2 with a shear transmitting medium before the said rod 2 enters apparatus 1 is seen as comprising housing 62 secured by means of threaded bolts 63 to radially spaced brackets 64 which, in turn, are secured to the upstream side of gear block 14 by means of threaded bolts 65. The longitudinal axis of housing 62 registers with the longitudinal axes of central bores 16 and 17 and of pressure cylinder 11. Housing 62 is provided with a first bore 66, a second larger bore 67, a third yet larger bore 68, a threaded section 69 and a fourth yet larger bore 70. Scraper 71 is positioned at the downstream side of bore 67, adjacent bore 66, and is secured in position by means of retainer ring 72. A sizing die 73 is mounted within bore 68, and is secured in position by means of threaded retaining ring 74 screwed into threaded section 69. A cover plate 75 having a projecting central portion 76 extending partially into bore 70 is secured to the upstream side of housing 62 by means of threaded bolts 77. Cover plate 75 is provided with counterbore 78 in which is mounted scraper 79 secured in position by means of retainer ring 80. Ring seal 81 is provided around projecting central portion 76 of cover plate 75.

Figure 4:
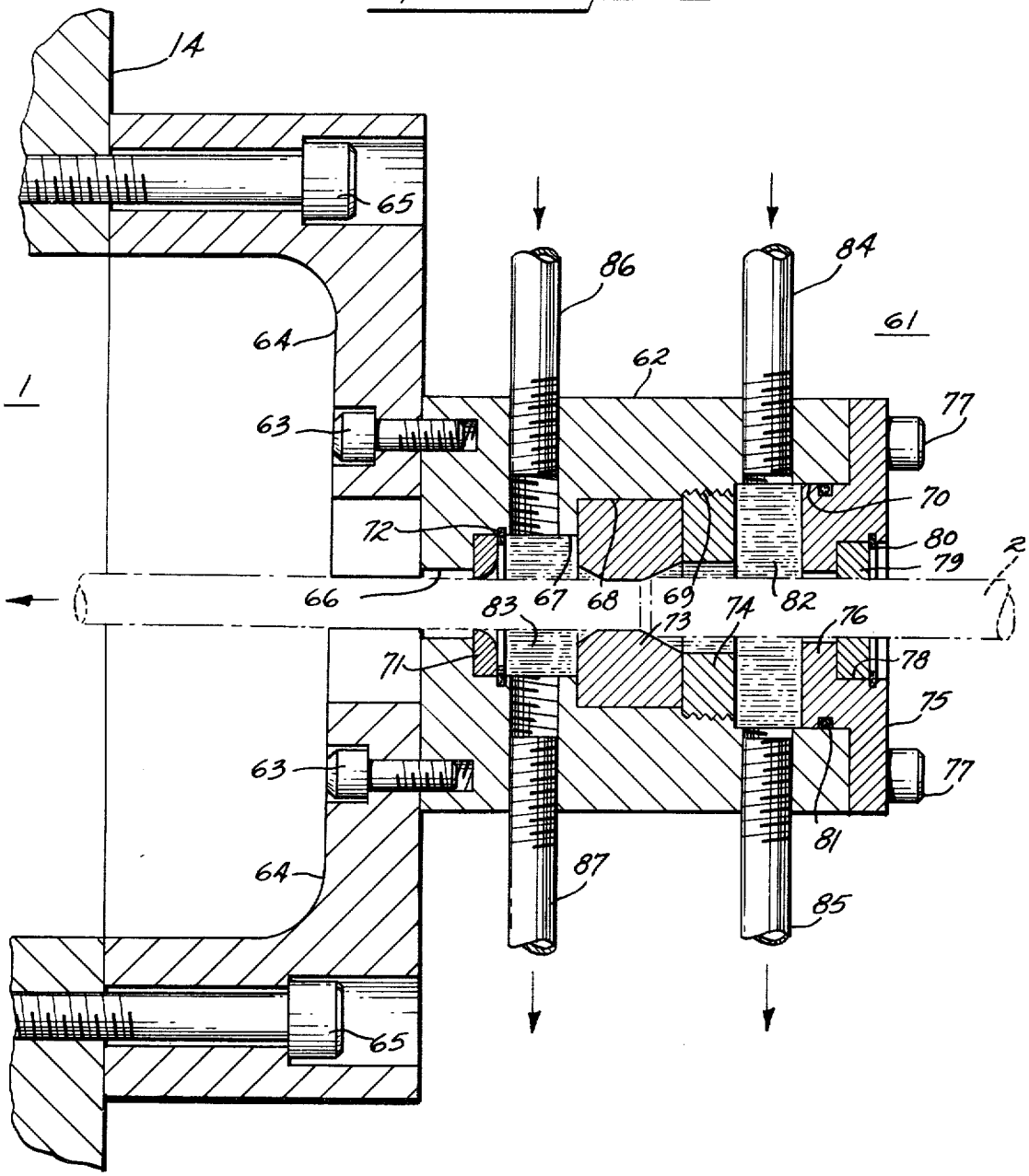
FIG. 4 represents a section taken along the line 4—4 of FIG. 2 of a portion of that end of the apparatus through which the rod enters, the rod being shown in phantom.

It will be seen, in FIG. 4, that there is a space in bore 70, between threaded retaining ring 74 and projecting central portion 76. This space constitutes a first coating chamber 82.

It will also be seen, in FIG. 4, that there is a space in bore 67, between scraper 71 and sizing die 73. This space constitutes a second coating chamber 83.

Feed conduit 84 communicates between a source (not shown) of shear transmitting medium and first coating chamber 82, thereby to supply said first coating chamber 82 with shear transmitting medium. Drain conduit 85 is provided to withdraw excess shear transmitting medium from first coating chamber 82, and, through a suitable conduit (not shown), the withdrawn shear transmitting medium may be recycled to the source.

Feed conduit 86 communicates between a source (not shown) of shear transmitting medium and second coating chamber 83, thereby to supply said second coating chamber 83 with shear transmitting medium. Drain conduit 87 is provided to withdraw excess shear transmitting medium from second coating chamber 83 and, through a suitable conduit (not shown), the withdrawn shear transmitting medium may be recycled to the source.

The shear transmitting medium which may be utilized in practicing the present invention will desirably have a high viscosity and shear strength, be capable of lubricating die 12, provide good wetting action on the rod 2, and have minimal viscosity variation with respect to pressure, temperature and shearing rate. Such a medium may otherwise be known as viscous fluid, and examples of such a suitable medium are beeswax and polyethylene wax.

It is known in the art that many metals and other materials increase in ductility, or have an increased capacity for deformation without fracture, when they are subjected to high pressure. This effect is known as the "Bridgman effect," and the principle is treated in "Large Plastic Flow and Fracture" by P. W. Bridgman, published by McGraw Hill (New York, 1952). The present invention is particularly adapted to subject rod 2 to such high pressures. For example, when rod 2 is of aluminum, apparatus 1 is designed so that pressure on rod 2 adjacent die 12 will be approximately 150,000 psi, and where rod 2 is of copper, apparatus 1 is designed so that pressure on the rod 2 adjacent die 12 will be approximately 250,000 psi. These pressures are far above the respective yield strengths of aluminum and copper, and will increase the ductility, or capacity for deformation without fracture, of these materials.

The operation of the present invention will now be described.

Rod 2 is fed from a source of supply (not shown) through apparatus 61. In passing through scraper 79, dirt and the like are removed from the surface of rod 2. In passing through first coating chamber 82, the surface of rod 2 is provided with a coating of shear transmitting medium which medium, beeswax in the preferred embodiment, is capable of lubricating a die. In passing through sizing die 73, the diameter of rod 2 is sized to a uniform value. In passing through second coating chamber 83, the surface of rod 2 is recoated with shear transmitting medium. In passing through scraper 71, shear transmitting medium in excess of the desired thickness of coating thereof on the surface of rod 2 is removed. Thereafter, coated rod 2 enters the entrance end 9 of apparatus 1.

Fluid motors 21a–21d and 23a–23d are operated, whereby gripping element quadrants 4 are propelled around their respective endless paths 6, each gripping element quadrant 4 cooperating with a gripping element quadrant 4 from each of the other trains thereof as they enter central bore 16 of gear block 14 until they leave central bore 17 of gear block 15 to form a gripping element 10. Thus, there is a constantly moving continuous train of gripping elements 10 being propelled from the entrance end 9 to the exit end 13 of apparatus 1.

As coated rod 2 enters the entrance end 9 of apparatus 1 (i.e., the upstream end of central bore 16), a gripping element 10 closely contacts the entire perimetric surface of a length of shear transmitting medium coating on the surface of rod 2, which length corresponds to the length of the said gripping element 10. In being propelled toward the exit end 13 of apparatus 1, the gripping element 10 provides a motive force along the surface of the shear transmitting medium and thereby produces a shear force in the shear transmitting medium, which shear force is applied along the said perimetric surface of rod 2 as a friction or viscous drag force, directed toward the exit end 13 of apparatus 1, which friction or viscous drag force tends to propel rod 2 toward the said exit end. The cumulative effort of the several gripping elements 10 producing such friction or viscous drag force along the perimetric surface of rod 2 results in a longitudinal or axial compressive stress gradient in the rod 2, which gradient increases from the entrance end 9 toward the die 12. At the same time, inasmuch as there is no passageway along the exterior surface of die 12 for the flow of shear transmitting medium (i.e., all of the coating of viscous shear transmitting medium on the surface of rod 2 must pass through die 12 along with rod 2), the pressure in the coating of shear transmitting medium upstream of die 12 accumulates from the entrance end 9 toward the die 12. In other words a pressure gradient is established in the coating of shear transmitting medium which gradient increases from the entrance end 9 toward die 12. It will be apparent, to those familiar with this are, that normal stress in rod 2 is a function of the pressure in the shear transmitting medium, and therefore rod 2 experiences normal stress increasing from said entrance end 9 to said die 12. Apparatus 1 is designed to operate in such a manner that the difference between axial stress and normal stress in rod 2 upstream of die 12 does not exceed the yield strength of the rod material.

Gripping element quadrants 4 constituting gripping elements 10 are supported against, and thereby contain, the pressure in the shear transmitting medium coating on rod 2. From the entrance end 9 of apparatus 1 downstream to the downstream side of gear block 14, lateral support required to be given to the gripping element quadrants 4 is normal, and this is provided by the wall of central bore 16, gripping element quadrants 4 being able to be moved readily through said central bore 16. Downstream of gear block 14, the pressure in the shear transmitting medium has risen to the point that substantial lateral support to gripping element quadrants 4 is required, which lateral support requirements will increase in the direction of die 12. It is the function of pressure cylinder 11 to supply this increasing lateral support to the gripping element quadrants in the manner hereinbefore described. It will be noted that the lateral support pressures obtained in pressure cylinder 11 are designed to balance the outward thrusts on gripping element quadrants 4 developed by the increasing pressures in the shear transmitting medium and are related to the axial stresses developed in rod 2 in such a manner that (1) sufficient lateral support is given to gripping element quadrants 4 so that at all points along pressure cylinder 11, the normal stress in rod 2 never falls to such a value that the rod axial stress exceeds the rod normal stress by an amount exceeding the yield strength of the rod material (as otherwise the rod 2 would be caused to bulge out or mushroom) and (2) excessive support pressures on gripping element quadrants 4, particularly in the upstream section of pressure cylinder 4 are never produced (as otherwise this may crush gripping element quadrants 4 against rod 2).

In the preferred mode of operation, rod 2 as it advances within pressure cylinder 11 toward die 12 is stressed in compression far above its yield strength to the range at which it exhibits increased ductility, or has an increased capacity for deformation without fracture. In such a state, rod 2 passes into die 12, along with the coating of shear transmitting medium, and is deformed to produce wire 3.

From the foregoing description, it will be clear that I have invented novel apparatus and method for continuously deforming a workpiece (e.g., rod) of indefinite length to produce a production (e.g., wire) of indefinite length.

What I claim is:

1. Method of continuously deforming an elongated workpiece of indefinite length to produce an elongated product of indefinite length, said method comprising:

a. continuously moving a train of gripping elements around an endless path, said path including a first station upstream of a deforming agency and a second station downstream of said deforming agency, the direction of travel of said train around said endless path being from said first station toward said second station;

b. placing said moving train of gripping elements between said first station and said deforming agency in continuous operative engagement with the elongated surface of said elongated workpiece thereby to continuously apply motive force along the elongated surface of said elongated workpiece in the direction of said deforming agency;

c. continuously advancing said elongated workpiece *against said deforming agency* by means of said motive force [ against said deforming agency ] to produce elongated product.

2. Method [ as in claim 1, further comprising:

d. during the performance of step (b), ] *for continuously deforming an elongated workpiece of indefinite length to produce an elongated product of indefinite length, said method comprising:*

*a. continuously moving a train of gripping elements around an endless path, said path including a first station upstream of a deforming agency and a second station downstream of said deforming agency, the direction of travel of said train around said endless path being from said first station toward said second station;*

*b. placing said moving train of gripping elements between said first station and said deforming agency in continuous operative engagement with the elongated surface of said elongated workpiece thereby to continuously apply motive force along the elongated surface of said elongated workpiece in the direction of said deforming agency; while simultaneously*

*c.* cumulating same motive force from said first station toward said deforming agency whereby to produce [ an axial ] *a compressive* stress gradient within said elongated workpiece increasing from said first station toward said deforming [ agency ] *agency; and*

*d. continuously advancing said elongated workpiece against said deforming agency by means of said motive force to produce elongated product.*

3. Method [ as in claim 1, further comprising:

d. simultaneously with step (b), ] *for continuously deforming an elongated workpiece of indefinite length to produce an elongated product of indefinite length, said method comprising:*

*a. continuously moving a train of gripping elements around an endless path, said path including a first station upstream of a deforming agency and a second station downstream of said deforming agency, the direction of travel of said train around said endless path being from said first station toward said second station;*

*b. placing said moving train of gripping elements between said first station and said deforming agency in continuous operative engagement with the elongated surface of said elongated workpiece thereby to continuously apply motive force along the elongated surface of said elongated workpiece in the direction of said deforming agency; while simultaneously*

*c.* continuously applying pressure on those surfaces of said gripping elements remote from the elongated surface of said elongated workpiece between said first station and said deforming agency whereby to maintain normal stress in said elongated workpiece of magnitude such that the difference between axial stress and normal stress in said elongated workpiece at any point between said first station and the entrance to said deforming agency does not exceed the yield strength of the workpiece [ material. ] *material; and*

*d. continuously advancing said elongated workpiece against said deforming agency by means of said motive force to produce elongated product.*

4. Method as in claim 2, further comprising:

e. simultaneously with steps (b) and [ (d) ] *(c)*, continuously applying a pressure gradient on those surfaces of said gripping elements remote from the elongated surface of said elongated workpiece between said first station and said deforming agency, said pressure gradient increasing said first station toward said deforming agency, whereby to maintain a normal stress gradient in said elongated workpiece increasing from said first station toward said deforming agency and of magnitude suchc that at any point between said first station and the entrance to said deforming agency the difference between axial stress and normal stress in said elongated workpiece does not exceed the yield strength of the workpiece material.

5. Method for continuously deforming an elongated workpiece of indefinite length to produce an elongated product of indefinite length, said method comprising:

a. continuously advancing an endless chamber from a first station upstream of a deforming agency to a second station downstream of said deforming agency, b. placing the interior of said endless chamber in continuous operative engagement with the entire perimeter of said elongated workpiece between said first station and said deforming agency thereby to continuously apply motive force along said entire perimeter in the direction of said deforming agency, c. continuously advancing said elongated workpiece *against said deforming agency* by means of said motive force [ against said deforming agency ] to produce elongated product.

6. Method as [ in claim 5, further comprising:

d. during the performance of step (b), ] *for continuously deforming an elongated workpiece of indefinite length to produce an elongated product of indefinite length, said method comprising:*

*a. continuously advancing an endless chamber from a first station upstream of a deforming agency to a second station downstream of said deforming agency,*

*b. placing the interior of said endless chamber in continuous operative engagement with the entire perimeter of said elongated workpiece between said first station and said deforming agency thereby to continously apply motive force along said entire perimeter in the direction of said deforming agency, while simultaneously*

*c.* cumulating said motive force from said first station toward said deforming agency whereby to produce [ an axial ] *a compressive* stress gradient within said elongated workpiece increasing from said first station toward said deforming [ agency. ] *agency; and*

*d. continuously advancing said elongated workpiece against said deforming agency by means of said motive force to produce elongated product.*

7. Method [ as in claim 5, further comprising:

d. simultaneously with step (b), ] *for continuously deforming an elongated workpiece of indefinite length to produce an elongated product of indefinite length, said method comprising:*

*a. continuously advancing an endless chamber from a first station upstream of a deforming agency to a second station downstream of said deforming agency,*

*b. placing the interior of said endless chamber in continuous operative engagement with the entire perimeter of said elongated workpiece between said first station and said deforming agency thereby to continuously apply motive force along said entire perimeter in the direction of said deforming agency, while simultaneously* c. continuously applying external pressure on and around the entire perimeter of said endless chamber from said first station to said deforming agency, said external pressure having sufficient magnitude to maintain normal stress in the elongated workpiece of magnitude such that the difference between axial stress and normal stress in the elongated workpiece at any point between said first station and the entrance to said deforming agency does not exceed the yield strength of the workpiece [ material. ] *material; and*

*d. continuously advancing said elongated workpiece against said deforming agency by means of said motive force to produce elongated product.*

8. Method as in claim 6, further comprising:

e. simultaneously with steps (b) and (c), continuously applying an external pressure gradient between said first station and said deforming agency on and around the entire perimeter of said endless chamber increasing from said first station toward said deforming agency, said external pressure gradient maintaining a normal stress gradient in said elongated workpiece increasing from said first station toward said deforming agency and of magnitude such that at any point between said first station and the entrance to said deforming agency the difference between axial stress and normal stress in the elongated workpiece does not exceed the yield strength of the workpiece material.

9. Method as in claim 5, further comprising:

d. performing step (a) by:

i. providing a plurality of trains of gripping elements;

ii. continuously moving each of said plurality of trains of gripping elements around an endless path, whereby to provide a plurality of endless paths of gripping elements, said first station and said second station and the span therebetween being common to all of said plurality of endless paths;

iii. cooperatively associating gripping elements in each of said plurality of trains at said first station to form said endless chamber and continuing said cooperation as said plurality of trains moves along said span toward said second station.

10. Method as in claim 5, further comprising:

d. performing step (a) by:

i. providing a plurality of trains of gripping elements;

ii. continuously moving each of said plurality of trains of gripping elements around an endless path, whereby to provide a plurality of endless paths of gripping elements, said first station and said second station and the span therebetween being common to all of said plurality of endless paths;

iii. cooperatively associating gripping elements in each of said plurality of trains at said first station to form said endless chamber and continuing said cooperation as said plurality of trains moves along said span toward said second station;

iv. discontinuing the said cooperation of said gripping elements at said second station.

11. Method for continuously deforming an elongated workpiece to produce an elongated product, said method comprising:

a. applying a coating of shear transmitting medium to the elongated surface of said elongated workpiece, b. continuously applying motive force in the direction of a deforming agency along that surface of said coating of shear transmitting medium remote from the elongated surface of said elongated workpiece, thereby to exert drag force along the elongated surface of said elongated workpiece in the direction of said deforming agency;

c. continuously advancing said elongated workpiece by means of said drag force against said deforming agency to produce an elongated product.

12. Method as in claim 11, wherein:

d. said coating of shear transmitting medium is applied to the entire perimeter of the elongated surface of said elongated workpiece.

13. Method as in claim 12, wherein:

e. said motive force is applied around the entire perimeter of the surface of said shear transmitting medium.

14. Method as in claim 11, wherein:

d. said motive force is applied to said surface of said shear transmitting medium from a first station upstream of said deforming agency, e. said coating of shear transmitting medium is continuously applied around the entire perimeter of the elongated surface of said elongated workpiece at a second station upstream of said first station as said elongated workpiece moves past said second station toward said first station.

15. Method as in claim 14, wherein:

f. said motive force is applied around the entire perimeter of the surface of said shear transmitting medium.

16. Method as in claim 11, wherein:

d. said shear transmitting medium is a viscous fluid.

17. Method as in claim 16, wherein:

e. said viscous fluid is beeswax.

18. Method as in claim 16, wherein:

e. said viscous fluid is polyethylene wax.

19. Method as in claim 11, wherein:

d. said motive force is applied to said surface of said shear transmitting medium from a station upstream of said deforming agency toward said deforming agency; said method further comprising:

e. simultaneously with step (b), continuously applying pressure on that surface of said coating of shear transmitting medium remote from the elongated surface of said elongated workpiece between said station and said deforming agency, thereby to maintain normal stress in said elongated workpiece of magnitude such that at any point between the entrance to said deforming agency and said station the difference between axial stress and normal stress in said elongated workpiece does not exceed the yield strength of the workpiece material.

20. Method for continuously deforming an elongated workpiece to produce an elongated product, said method comprising:

a. applying a coating of shear transmitting medium to the elongated surface of said elongated workpiece;

b. continuously applying motive force in the direction of a deforming agency from a station upstream of said deforming agency along that surface of said coating of shear transmitting medium remote from the elongated surface of said elongated workpiece and cumulating said motive force from said station toward said deforming agency, thereby to exert drag force along the elongated surface of said elongated workpiece in the direction of said deforming agency, said drag force increasing in magnitude from said station toward said deforming agency, and producing [ an axial ] *a compressive* stress gradient in said elongated workpiece increasing from said station toward said deforming agency;

c. continuously advancing said elongated workpiece by means of said drag force against said deforming agency to produce an elongated product.

21. Method as in claim 20, wherein:

d. said coating of shear transmitting medium is applied to the entire perimeter of the elongated surface of said elongated workpiece.

22. Method as in claim 21, wherein:

e. said motive force is applied around the entire perimeter of the surface of said shear transmitting medium.

23. Method as in claim 20, wherein:

d. said coating of shear transmitting medium is continuously applied around the entire perimeter of the elongated surface of said elongated workpiece at a second station upstream of said first mentioned station as said elongated workpiece moves past said second station toward said first mentioned station.

24. Method as in claim 23, wherein:

e. said motive force is applied around the entire perimeter of the surface of said shear transmitting medium.

25. Method as in claim 20, wherein:

d. said shear transmitting medium is a viscous fluid.

26. Method as in claim 25, wherein:

e. said viscous fluid is beeswax.

27. Method as in claim 25, wherein:

e. said viscous fluid is polyethylene wax.

28. Method as in claim 20, further comprising:

d. simultaneously with step (b), continuously applying pressure between said first mentioned station and said deforming agency on that surface of said coating of shear transmitting medium remote from the elongated surface of said elongated workpiece, said pressure increasing in magnitude from said first mentioned station toward said deforming agency, thereby to maintain normal stress in said elongated workpiece increasing in magnitude from said first mentioned station toward said deforming agency, the difference in magnitude between said axial stress and normal stress in said elongated workpiece at any point upstream of the entrance to said deforming agency not exceeding the yield strength of the workpiece material.

29. Method for continuously deforming an elongated workpiece of indefinite length to produce an elongated product of indefinite length, said method comprising:

a. applying a coating of shear transmitting medium to the entire perimeter of the elongated surface of said elongated workpiece;

b. continuously advancing from a first station upstream of a deforming agency to a second station downstream of said deforming agency an endless chamber encircling and in contact with that surface of said coating of shear transmitting medium remote from the elongated surface of said elongated workpiece thereby to apply motive force in the direction of said deforming agency along said surface of said coating and cumulating said force from said first station toward said deforming agency, whereby to exert drag force along the elongated surface of said elongated workpiece in the direction of said deforming agency, said drag force increasing in magnitude from said first station toward said deforming agency and producing [ an axial ] *a compressive* stress gradient in said elongated workpiece increasing from said first station toward said deforming agency;

c. continuously advancing said elongated workpiece by means of said drag force against said deforming agency to produce an elongated product.

30. Method as in claim 29, wherein:

d. said coating of shear transmitting medium is continuously applied around the entire perimeter of the elongated surface of said elongated workpiece at a third station upstream of said first station as said elongated workpiece moves past said third station toward said first station.

31. Method as in claim 29, wherein:

d. said shear transmitting medium is a viscous fluid.

32. Method as in claim 31, wherein:

e. said viscous fluid is beeswax.

33. Method as in claim 31, wherein:

e. said viscous fluid is polyethylene wax.

34. Method as in claim 29, further comprising:

d. continuously applying external pressure on and around the entire perimeter of said endless chamber from said first station to said deforming agency, said external pressure having sufficient magnitude to maintain normal stress in the elongated workpiece of magnitude such that the difference between axial stress and normal stress in the elongated workpiece at any point between said first station and the entrance to said deforming agency does not exceed the yield strength of the workpiece material.

35. Method as in claim 29, further comprising:

d. continuously applying an external pressure gradient between said first station and said deforming agency on and around the entire perimeter of said endless chamber increasing from said first station toward said deforming agency, said external pressure gradient maintaining a normal stress gradient in said elongated workpiece increasing from said first station toward said deforming agency and of magnitude such that at any point between said first station and the entrance to said deforming agency the difference between axial stress and normal stress in the elongated workpiece does not exceed the yield strength of the workpiece material.

36. Apparatus for continuously deforming an elongated workpiece of indefinite length to produce an elongated product of indefinite length, said apparatus comprising:

a. a deforming agency;

b. a train of gripping elements;

c. first means providing an endless path for said train of gripping elements, said path including a first station upstream of said deforming agency and a second station downstream of said deforming agency;

d. second means for continuously moving said train of gripping elements around said endless path, the direction of travel of said train of gripping elements being from said first station toward said second station;

e. third means for *continuously advancing said elongated workpiece against said deforming agency to produce elongated product, said third means comprising means for* placing said moving train of gripping elements between said first station and said deforming agency in continuous operative engagement with the elongated surface of said elongated workpiece, thereby to continuously apply motive force along the elongated surface of said elongated workpiece in the direction of said deforming [ agency and continuously advance said elongated workpiece against said deforming agency to produce elongated product. ] *agency.*

37. Apparatus [ as in claim 36, wherein:

f. said apparatus is adapted to cumulate ] *for continuously deforming an elongated workpiece of indefinite length to produce an elongated product of indefinite length, said apparatus comprising:*

*a. a deforming agency;*

*b. a train of gripping elements;*

*c. frist means providing an endless path for said train of gripping elements, said path including a first station upstream of said deforming agency and a second station downstream of said deforming agency;*

*d. second means for continuously moving said train of gripping elements around said endless path, the direction of travel of said train of gripping elements being from said first station toward said second station;*

*e. third means for continuously advancing said elongated workpiece against said deforming agency to produce elongated product, said third means comprising means for placing said moving train of gripping elements between said first station and said deforming agency in continuous operative engagement with the elongated surface of said elongated workpiece, thereby to continuously apply motive force along the elongated surface of said elongated workpiece in the direction of said deforming agency, said third means further comprising means for cumulating* motive force from said first station toward said deforming agency whereby to produce [ an axial ] *a compressive* stress gradient within said elongated workpiece increasing from said first station toward said deforming agency.

38. [ Apparatus as in claim 36, wherein:

f. said third means is adapted to continuously apply ] *Apparatus for continuously deforming an elongated workpiece of indefinite length to produce an elongated product of indefinite length, said apparatus comprising:*

*a. a deforming agency;*

*b. a train of gripping elements;*

*c. first means providing an endless path for said train of gripping elements, said path including a first station upstream of said deforming agency and a second station downstream of said deforming agency;*

*d. second means for continuously moving said train of gripping elements around said endless path, the direction of travel of said train of gripping elements being from said first station toward said second station;*

*e. third means for continuously advancing said elongated workpiece against said deforming agency to produce elongated product, said third means comprising means for placing said moving train of gripping elements between said first station and said deforming agency in continuous operative engagement with the elongated surface of said elongated workpiece, thereby to continuously apply motive force along the elongated surface of said elongated workpiece in the direction of said deforming agency, said third means further comprising means for continuously applying* pressure on those surfaces of said gripping elements remote from the elongated surface of said elongated workpiece between said first station and said deforming agency whereby to maintain normal stress in said elongated workpiece of magnitude such that the difference between axial stress and normal stress in said elongated workpiece at any point between said first station and the entrance to said deforming agency does not exceed the yield strength of the workpiece material.

39. [ Apparatus as in claim 36, wherein:

f. said third means is adapted to continuously apply ] *Apparatus for continuously deforming an elongated workpiece of indefinite length to produce an elongated product of indefinite length, said apparatus comprising:*

*a. a deforming agency;*

*b. a train of gripping elements;*

*c. first means providing an endless path for said train of gripping elements, said path including a first station upstream of said deforming agency and a second station downstream of said deforming agency;*

*d. second means for continuously moving said train of gripping elements around said endless path, the direction of travel of said train of gripping elements being from said first station toward said second station;*

*e. third means for continuously advancing said elongated workpiece against said deforming agency to produce elongated product, said third means comprising means for placing said moving train of gripping elements between said first station and said deforming agency in continuous operative engagement with the elongated surface of said elongated workpiece, thereby to continuously apply motive force along the elongated surface of said elongated workpiece in the direction of said deforming agency, said third means further comprising means for continuously applying* a pressure gradient on those surface of said gripping elements remote from the elongated surface of said elongated workpiece between said first station and said deforming agency, said pressure gradient increasing from said first station toward said deforming agency, whereby to maintain a normal stress gradient in said elongated workpiece increasing from said first station toward said deforming agency and of magnitude such that at any point between said first station and the entrance to said deforming agency the difference between axial stress and normal stress in said elongated workpiece does not exceed the yield strength of the workpiece material.

40. Apparatus for continuously deforming an elongated workpiece of indefinite length to produce an elongated product of indefinite length, said apparatus comprising:

a. a deforming agency;

b. a plurality of trains of gripping elements;

c. a plurality of first means, each of said first means being operatively associated with one train of gripping elements and providing an endless path for said train of gripping elements;

d. a plurality of second means, each of said second means being operatively associated with one train of gripping elements and being adapted to continuously move said train of gripping elements around its respective endless path past a first station upstream of said deforming agency toward a second station downstream of said deforming agency, the first and second stations and the span therebetween being common to all of said plurality of endless paths;

e. the gripping elements in each of said pluarlity of moving trains of gripping elements being [ adapted ] *configured* to cooperate with each other to form an endless centrally apertured chamber extending between and moving from said first station to said second station;

f. the moving endless chamber receiving the elongated workpiece in the central aperture thereof and being [ adapted to ] *configured to continuously advance said elongated workpiece against said deforming agency and produce elongated product by* continuously [ operative engage ] *operatively engaging the entire perimeter of the elongated surface of the elongated workpiece* [ thereby ] *for* to continuously [ apply ] *applying* motive force along the entire perimeter of the elongated surface of the elongated workpiece in the direction of the deforming [ agency, whereby to continuously advance said elongated workpiece against said deforming agency and produce elongated product.] *agency.*

41. Apparatus as in claim 40, wherein g. the moving endless chamber is [ adapted ] *configured* to cumulate motive force from said first station toward said deforming agency whereby to produce [ an axial ] *a compressive* stress gradient within said elongated workpiece increasing from said first station toward said deforming agency.

42. Apparatus as in claim 40, further comprising:

g. third means [ adapted to ] *for* continuously [ apply ] *applying* external pressure on and around the entire perimeter of the endless chamber from said first station to said deforming agency whereby to maintain normal stress in the elongated workpiece between the first station and the deforming agency of magnitude such that at any point between the entrance to said deforming agency and said first station the difference between axial stress and normal stress in said elongated workpiece does not exceed the yield strength of the workpiece material.

43. Apparatus as in claim 41, further comprising:

h. third means [ adapted to ] *for* continuously [ apply ] *applying* an external pressure gradient on and around the entire perimeter of the endless chamber from said first station to said deforming agency, said pressure gradient increasing from said first station toward said deforming agency whereby to maintain a normal stress gradient in said elongated workpiece increasing from said first station toward said deforming agency of magnitude such that at any point between the entrance to said deforming agency and said first station the difference between axial stress and normal stress in said elongated workpiece does not exceed the yield strength of the workpiece material.

44. Apparatus for continuously deforming an elongated workpiece to produce an elongated product, said apparatus comprising:

a. a deforming agency;

b. first means for applying a coating of shear transmitting medium to the elongated surface of said elongated workpiece;

c. second means between said deforming agency and said first means for continuously applying motive force in the direction of said deforming agency along that surface of said coating of shear transmitting medium remote from the elongated surface of said elongated workpiece thereby to exert drag force along the elongated surface of said elongated workpiece in the direction of said deforming agency and continuously advance said elongated workpiece against said deforming agency to produce elongated product.

45. Apparatus as in claim 44, wherein:

d. said first means is adapted to apply said coating of shear transmitting medium to the entire perimeter of the elongated surface of said elongated workpiece.

46. Apparatus as in claim 45, wherein:

e. said second means is adapted to apply motive force around the entire perimeter of said coating of shear transmitting medium.

47. Apparatus as in claim 44, wherein:

d. said first means is adapted to continuously apply said coating of shear transmitting medium around the entire perimeter of the elongated surface of the elongated workpiece as the elongated workpiece moves past said first means toward said second means.

48. Apparatus as in claim 47, wherein:

e. said second means is adapted to apply motive force around the entire perimeter of said coating of shear transmitting medium.

49. Apparatus as in claim 44, wherein:

d. said shear transmitting medium is a viscous fluid.

50. Apparatus as in claim 49, wherein:

e. said viscous fluid is beeswax.

51. Apparatus as in claim 49, wherein:

e. said viscous fluid is polyethylene wax.

52. Apparatus as in claim 44, further comprising:

d. third means to continuously apply pressure on that surface of said coating of shear transmitting medium remote from the elongated surface of said elongated workpiece between said deforming agency and said first means to maintain normal stress in said elongated workpiece of magnitude such that at any point between the entrance to said deforming agency and said first means the difference between axial stress and normal stress in said elongated workpiece does not exceed the yield strength of the workpiece material.

53. Apparatus for continuously deforming an elongated workpiece to produce an elongated product, said apparatus comprising:

a. a deforming agency;

b. first means for applying a coating of shear transmitting medium to the elongated surface of said elongated workpiece;

c. second means between said deforming agency and said first means for continuously applying motive force in the direction of said deforming agency from a first station upstream of said deforming agency to said deforming agency along that surface of said coating of shear transmitting medium remote from the elongated surface of said elongated workpiece, said second means being adapted to cumulate said motive force from said first station toward said deforming agency thereby to exert drag force along the elongated surface of said elongated workpiece in the direction of said deforming agency which drag force increases from said first station toward said deforming agency, and thus to advance said elongated workpiece against said deforming agency to produce elongated product.

54. Apparatus as in claim 53, wherein:

d. said first means is adapted to apply said coating of shear transmitting medium to the entire perimeter of the elongated surface of said elongated workpiece.

55. Apparatus as in claim 54, wherein:

e. said second means is adapted to apply motive force around the entire perimeter of said coating of shear transmitting medium.

56. Apparatus as in claim 53, wherein:

d. said first means is adapted to continuously apply said coating of shear transmitting medium around the entire perimeter of the elongated surface of the elongated workpiece as the elongated workpiece moves past said first means toward said second means.

57. Apparatus as in claim 56, wherein:

e. said second means is adapted to apply motive force around the entire perimeter of said coating of shear transmitting medium.

58. Apparatus as in claim 53, wherein:

d. said shear transmitting medium is a viscous fluid.

59. Apparatus as in claim 58, wherein:

d. said viscous fluid is beeswax.

60. Apparatus as in claim 58, wherein:

d. said viscous fluid is polyethylene wax.

61. Apparatus as in claim 53, further comprising:

d. third means to continuously apply a pressure gradient on that surface of said coating of shear transmitting medium remote from the elongated surface of said elongated workpiece between said first station and said deforming agency and increasing from said first station toward said deforming agency to maintain a normal stress gradient in said elongated workpiece increasing from said first station toward said deforming agency and of magnitude such that at any point between said first station and the entrance to said deforming agency the difference between axial stress and normal stress in said elongated workpiece does not exceed the yield strength of the workpiece material.

62. Apparatus for continuously deforming an elongated workpiece of indefinite length to produce an elongated product of indefinite length, said apparatus comprising:

a. a deforming agency;

b. first means for applying a coating of shear transmitting medium to the entire perimeter of the elongated surface of said elongated workpiece;

c. an endless chamber between said deforming agency and said first means, said endless chamber being adapted to encircle and contact that surface of said coating of shear transmitting medium remote from the elongated surface of said elongated workpiece;

d. second means to continuously advance said endless chamber from a first station upstream of said deforming agency to a second station downstream of said deforming agency thereby to continuously apply motive force in the direction of said deforming agency along said surface of said coating and thereby exert drag force along the elongated surface of said elongated workpiece in the direction of said deforming agency and continuously advance said elongated workpiece against said deforming agency to produce elongated product.

63. Apparatus as in claim 62, wherein:

e. said first means is adapted to continuously apply said coating of shear transmitting medium around the entire perimeter of the elongated surface of said elongated workpiece at a third station upstream of said first station as said elongated workpiece moves past said third station toward said first station.

64. Apparatus as in claim 62, wherein:

e. said shear transmitting medium is a viscous fluid.

65. Apparatus as in claim 64, wherein:

f. said viscous fluid is beeswax.

66. Apparatus as in claim 64, wherein:

f. said viscous fluid is polyethylene wax.

67. Apparatus as in claim 62, further comprising:

e. third means to continuously apply external pressure on and around the entire perimeter of said endless chamber from said first station to said deforming agency sufficient to maintain normal stress in said elongated workpiece of magnitude such that the difference between axial stress and normal stress in the elongated workpiece between said first station and the entrance to said deforming agency does not exceed the yield strength of the workpiece material.

68. Apparatus as in claim 62, further comprising:

e. third means to continuously apply an external pressure gradient on and around the entire perimeter of said endless chamber increasing from said first station toward said deforming agency, said external pressure gradient maintaining a normal stress gradient in said elongated workpiece increasing from said first station toward said deforming agency and of magnitude such that at any point between said first station and the entrance to said deforming agency the difference between axial stress and normal stress in the elongated workpiece does not exceed the yield strength of the workpiece material.

69. Apparatus as in claim 62, wherein:

e. said endless chamber comprises:

i. a plurality of trains of gripping elements, ii. a plurality of third means, each of said third means being operatively associated with one of said trains of gripping elements and providing an endless path for said train of gripping elements, iii. said first station and second station and the span therebetween being common to all of said plurality of endless paths, iv. gripping elements from all of said trains being adapted to cooperate to form said endless chamber at said first station and being further adapted to continue such cooperation along said span.

70. Apparatus as in claim 62, wherein:

e. said endless chamber comprises:

i. a plurality of trains of gripping elements, ii. a plurality of third means, each of said third means being operatively associated with one of said trains of gripping elements and providing an endless path for said train of gripping elements, iii. said first station and second station and the span therebetween being common to all of said plurality of endless paths, iv. said gripping elements being further adapted to discontinue such cooperation at said second station.

71. Apparatus as in claim 62, wherein:

g. said endless chamber is adapted to slidably sealingly engage the external surface of said deforming agency in moving from said first relation to said second station.

72. Apparatus as in claim 67, wherein:

f. said third means comprises:

i. a cylinder having a central aperture receiving said endless chamber, ii. fourth means to maintain fluid pressure in said central aperture between said cylinder and the external surface of said endless chamber.

73. Apparatus as in claim 68, wherein:

f. said third means comprises:

i. a cylinder having a central aperture receiving said endless chamber, ii. spaced sealing means interposed between said cylinder and the external surface of said endless chamber along said central aperture and dividing said central aperture into a plurality of pressure chambers, iii. fourth means to introduce pressurized fluid into that endmost pressure chamber adjacent said deforming agency, iv. a plurality of pressure reducing valves, each pressure reducing valve being operatively interposed between adjacent pressure chambers, the pressure reducing valves being arranged to provide decreasing fluid pressure in the plurality of pressure chambers toward the upstream end of said cylinder.

74. Method for continuously deforming an elongated workpiece of indefinite length to produce an elongated product of indefinite length, said method comprising:

continuously moving from a first station upstream of a deforming agency around said deforming agency to a second station downstream of said deforming agency a train of gripping elements encircling said elongated workpiece and in operative engagement with the entire perimeter of said elongated workpiece from said first station to said deforming agency, thereby to continuously apply motive force along the said perimeter of said elongated workpiece in the direction of said deforming agency whereby to continuously advance said elongated workpiece against said deforming agency to produce elongated product.

75. Method for continuously deforming an elongated workpiece of indefinite length to produce an elongated product of indefinite length, said method comprising:

a. applying a coating of shear transmitting medium to the entire perimeter of the elongated surface of said elongated workpiece at a first station upstream of a deforming agency;

b. continuously moving from a second station between said deforming agency and said first station around and slidably sealingly engaging the perimeter of said deforming agency to a third station downstream of said deforming agency a train of gripping elements encircling said elongated workpiece and in operative engagement with the entire perimeter of that surface of said coating of shear transmitting medium remote from the elongated surface of said elongated workpiece from said second station to said deforming agency thereby to apply motive force to said surface of said coating of shear transmitting medium and drag force along the elongated surface of said elongated workpiece from said second station to said deforming agency;

c. whereby to continuously advance said elongated workpiece and said coating of shear transmitting medium through said deforming agency to produce elongated product.

76. Apparatus for continuously deforming an elongated workpiece of indefinite length to produce an elongated product of indefinite length, said apparatus comprising:

a. a deforming agency, b. a train of gripping elements adapted to encircle said elongated workpiece and further adapted to operatively engage the entire perimeter of said elongated workpiece from a first station upstream of said deforming agency to said deforming agency, c. means [ to continuously move ] *for continuously advancing said elongated workpiece against said deforming agency to produce elongated product by continuously moving* said train of gripping elements from said first station around said deforming agency to a second station downstream of said deforming [ agency, d. thereby ] *agency so as* to continuously apply motive force along the said perimeter of said elongated workpiece in [ the direction of said deforming agency whereby to continuously advance said elongated workpiece against said deforming agency to produce elongated product. ] *the direction of said deforming agency.*

77. Apparatus as in claim 76, wherein:

d. said train of gripping elements is endless.

78. Apparatus for continuously deforming an elongated workpiece of indefinite length to produce an elongated product of indefinite length, said apparatus comprising:

a. a deforming agency, b. first means adapted to apply a coating of shear transmitting medium to the entire perimeter of the elongated surface of said elongated workpiece at a first station upstream of said deforming agency, c. a train of gripping elements adapted to encircle said elongated workpiece and adapted to operatively engage the entire perimeter of that surface of said coating of shear transmitting medium remote from the elongated surface of said elongated workpiece from a second station between said deforming agency and said first station to said deforming agency, said train of gripping elements being further adapted to slidably sealingly engage the perimeter of said deforming agency, d. second means to continuously move said train of gripping elements from said second station past said deforming agency in sliding sealing engagement with the perimeter thereof to a third station downstream of said deforming agency, e. thereby to apply motive force to said surface of said coating of shear transmitting medium and drag force along the elongated surface of said elongated workpiece from said second station to said deforming agency, f. whereby to continuously advance said elongated workpiece and said coating of shear transmitting medium through said deforming agency to produce elongated product.

79. Apparatus as in claim 78, wherein:

g. said train of gripping elements is endless.

80. Apparatus as in claim 78, wherein:

g. said shear transmitting medium is a viscous fluid.

81. Apparatus as in claim 80, wherein:

h. said viscous fluid is beeswax.

82. Apparatus as in claim 80, wherein:

h. said viscous fluid is polyethylene wax.

*83. Method for continuously deforming an elongated workpiece of indefinite length to produce an elongated product of indefinite length, said method comprising:*

*a. continuously moving a motive means around an endless path, said path including a first station upstream of a deforming agency and a second station downstream of said deforming agency, the direction of travel of said motive means around said endless path being from said first station toward said second station;*

*b. continuously placing successive portions of said motive means between said first station and said deforming agency in operative engagement with the elongated surface of said elongated workpiece thereby to continuously apply motive force along the elongated surface of said elongated workpiece in the direction of said deforming agency;*

*c. continuously advancing said elongated workpiece against said deforming agency by means of said motive force to produce elongated product.*

*84. Method for continuously deforming an elongated workpiece of indefinite length to produce an elongated product of indefinite length, said method comprising:*

*a. continuously moving a motive means around an endless path, said path including a first station upstream of a deforming agency and a second station downstream of said deforming agency, the direction of travel of said motive means around said endless path being from said first station toward said second station;*

*b. continuously placing successive portions of said motive means between said first station and said deforming agency in operative engagement with the elongated surface of said elongated workpiece thereby to continuously apply motive force along the elongated surface of said elongated workpiece in the direction of said deforming agency; while simultaneously*

*c. cumulating said motive force from said first station toward said deforming agency whereby to produce a compressive stress gradient within said elongated workpiece increasing from said first station toward said deforming agency and*

*d. continuously advancing said elongated workpiece against said deforming agency by means of said motive force to produce elongated product.*

*85. Method for continuously deforming an elongated workpiece of indefinite length to produce an elongated product of indefinite length, said method comprising:*

*a. continuously moving a motive means around an endless path, said path including a first station upstream of a deforming agency and a second station downstream of said deforming agency, the direction of travel of said motive means around said endless path being from said first station toward said second station;*

*b. continuously placing successive portions of said motive means between said first station and said deforming agency in operative engagement with the elongated surface of said elongated workpiece thereby to continuously apply motive force along the elongated surface of said elongated workpiece in the direction of said deforming agency; while simultaneously*

*c. continuously applying pressure on that surface of said motive means remote from the elongated surface of said elongated workpiece between said first station and said deforming agency whereby to maintain normal stress in said elongated workpiece of magnitude such that the difference between axial stress and normal stress in said elongated workpiece at any point between said first station and the entrance to said deforming agency does not exceed the yield strength of the workpiece material and*

*d. continuously advancing said elongated workpiece against said deforming agency be means of said motive force to produce elongated product.*

*86. Method as in claim 84, further comprising:*

*e. simultaneously with steps (b) and (c), continuously applying pressure on that surface of said motive means remote from the elongated surface of said elongated workpiece between said first station and said deforming agency, whereby to maintain a normal stress gradient in said elongated workpiece increasing from said first station toward said deforming agency and of magnitude such that at any point between said first station and the entrance to said deforming agency the difference between axial stress and normal stress in said elongated workpiece does not exceed the yield strength of the workpiece material.*

*87. Method for continuously deforming an elongated workpiece of indefinite length to produce an elongated product of indefinite length, said method comprising:*

*a. continuously moving an endless surface around an endless path including a first station upstream of a deforming agency and a second station downstream of said deforming agency in such manner that successive portions of said endless surface between said first station and said deforming agency provide a chamber continuously advancing from said first station toward said deforming agency,*

*b. placing the interior of said chamber in continuous operative engagement with the surface of said elongated workpiece from said first station to said deforming agency thereby to continuously apply motive force along said surface in the direction of said deforming agency,*

*c. continuously advancing said elongated workpiece against said deforming agency by means of said motive force against said deforming agency to produce*

*elongated product.*

*88. Method for continuously deforming an elongated workpiece of indefinite length to produce an elongated product of indefinite length, said method comprising:*

*a. continuously moving an endless surface around an endless path including a first station upstream of a deforming agency and a second station downstream of said deforming agency in such manner that successive portions of said endless surface between said first station and said deforming agency provide a chamber continuously advancing from said first station toward said deforming agency,*

*b. placing the interior of said chamber in continuous operative engagement with the surface of said elongated workpiece from said first station to said deforming agency thereby to continuously apply motive force along said surface in the direction of said deforming agency, while simultaneously*

*c. cumulating said motive force from said first station toward said deforming agency whereby to produce a compressive stress gradient within said elongated workpiece increasing from said first station toward said deforming agency and*

*d. continuously advancing said elongated workpiece by means of said motive force against said deforming agency to produce elongated product.*

*89. Method for continuously deforming an elongated workpiece of indefinite length to produce an elongated product of indefinite length, said method comprising:*

*a. continuously moving an endless surface around an endless path including a first station upstream of a deforming agency and a second station downstream of said deforming agency in such manner that successive portions of said endless surface between said first station and said deforming agency provide a chamber continuously advancing from said first station toward said deforming agency,*

*b. placing the interior of said chamber in continuous operative engagement with the surface of said elongated workpiece from said first station to said deforming agency thereby to continuously apply motive force along said surface in the direction of said deforming agency, while simultaneously*

*c. continuously applying external pressure on the perimeter of said chamber from said first station to said deforming agency, said external pressure having sufficient magnitude to maintain normal stress in the elongated workpiece of magnitude such that the difference between axial stress and normal stress in the elongated workpiece at any point between said first station and the entrance to said deforming agency does not exceed the yield strength of the workpiece material and*

*d. continuously advancing said elongated workpiece by means of said motive force against said deforming agency to produce elongated product.*

*90. Method as in claim 88, further comprising:*

*d. simultaneously with steps (b) and (c), continuously applying an external pressure gradient between said first station and said deforming agency on the perimeter of said chamber increasing from said first station toward said deforming agency, said external pressure gradient maintaining a normal stress gradient in said elongated workpiece increasing from said first station toward said deforming agency and of magnitude such that at any point between said first station and the entrance to said deforming agency the difference between axial stress and normal stress in the elongated workpiece does not exceed the yield strength of the workpiece material.*

*91. Apparatus for continuously deforming an elongated workpiece of indefinite length to produce an elongated product of indefinite length, said apparatus comprising:*

*a. a deforming agency;*

*b. motive means;*

*c. first means providing an endless path for said motive means, said path including a first station upstream of said deforming agency and a second station downstream of said deforming agency;*

*d. second means for continuously moving said motive means around said endless path, the direction of travel of said motive means being from said first station toward said second station;*

*e. third means for continuously advancing said elongated workpiece against said deforming agency to produce elongated product, said third means comprising means for placing said moving motive means between said first station and said deforming agency in continuous operative engagement with the elongated surface of said elongated workpiece, thereby to continuously apply motive force along the elongated surface of said elongated workpiece in the direction of said deforming agency.*

*92. Apparatus for continuously deforming an elongated workpiece of indefinite length to produce an elongated product of indefinite length, said apparatus comprising:*

*a. a deforming agency;*

*b. motive means;*

*c. first means providing an endless path for said motive means, said path including a first station upstream of said deforming agency and a second station downstream of said deforming agency;*

*d. second means for continuously moving said motive means around said endless path, the direction of travel of said motive means being from said first station toward said second station;*

*e. third means for continuously advancing said elongated workpiece against said deforming agency to produce elongated product, said third means comprising means for placing said moving motive means between said first station and said deforming agency in continuous operative engagement with the elongated surface of said elongated workpiece, thereby to continuously apply motive force along the elongated surface of said elongated workpiece in the direction of said deforming agency, said third means further comprising means for cumulating motive force from said first station toward said deforming agency whereby to produce a compressive stress gradient within said elongated workpiece increasing from said first station toward said deforming agency.*

*93. Apparatus for continuously deforming an elongated workpiece of indefinite length to produce an elongated product of indefinite length, said apparatus comprising:*

*a. a deforming agency;*

*b. motive means;*

*c. first means providing an endless path for said motive means, said path including a first station upstream of said deforming agency and a second station downstream of said deforming agency;*

*d. second means for continuously moving said motive means around said endless path, the direction of travel of said motive means being from said first*

*station toward said second station;*

*e. third means for continuously advancing said elongated workpiece against said deforming agency to produce elongated product, said third means comprising means for placing said moving motive means between said first station and said deforming agency in continuous operative engagement with the elongated surface of said elongated workpiece, thereby to continuously apply motive force along the elongated surface of said elongated workpiece in the direction of said deforming agency, said third means further comprising means for continuously applying pressure on that surface of said motive means remote from the elongated surface of said elongated workpiece between said first station and said deforming agency whereby to maintain normal stress in said elongated workpiece of magnitude such that the difference between axial stress and normal stress in said elongated workpiece at any point between said first station and the entrance to said deforming agency does not exceed the yield strength of the workpiece material.*

*94. Apparatus for continuously deforming an elongated workpiece of indefinite length to produce an elongated product of indefinite length, said apparatus comprising:*

*a deforming agency;*

*b. motive means;*

*c. first means providing an endless path for said motive means, said path including a first station upstream of said deforming agency and a second station downstream of said deforming agency;*

*d. second means for continuously moving said motive means around said endless path, the direction of travel of said motive means being from said first station toward said second station;*

*e. third means for continuously advancing said elongated workpiece against said deforming agency to produce elongated product, said third means comprising means for placing said moving motive means between said first station and said deforming agency in continuous operative engagement with the elongated surface of said elongated workpiece, thereby to continuously apply motive force along the elongated surface of said elongated workpiece in the direction of said deforming agency, said third means further comprising means for continuously applying a pressure gradient on that surface of said motive means remote from the elongated surface of said elongated workpiece between said first station and said deforming agency, said pressure gradient increasing from said first station toward said deforming agency, whereby to maintain a normal stress gradient in said elongated workpiece increasing from said first station toward said deforming agency and of magnitude such that at any point between said first station and the entrance to said deforming agency the difference between axial stress and normal stress in said elongated workpiece does not exceed the yield strength of the workpiece material.*

*95. Method for continuously deforming an elongated workpiece of indefinite length to produce an elongated product of indefinite length, said method comprising:*

*continuously moving from a first station upstream of a deforming agency around said deforming agency to a second station downstream of said deforming agency motive means in operative engagement with the surface of said elongated workpiece from said first station to said deforming agency, thereby to continuously apply motive force along the said surface of said elongated workpiece in the direction of said deforming agency whereby to continuously advance said elongated workpiece against said deforming agency to produce elongated product.*

*96. Apparatus for continuously deforming an elongated workpiece of indefinite length to produce an elongated product of indefinite length, said apparatus comprising:*

*a. a deforming agency,*

*b. motive means for operatively engaging the surface of said elongated workpiece from a first station upstream of said deforming agency to said deforming agency,*

*c. means for continuously advancing said elongated workpiece against said deforming agency to produce elongated product, said means comprising means for continuously moving said motive means from said first station around said deforming agency to a second station downstream of said deforming agency so as to continuously apply motive force along the said surface of said elongated workpiece in the direction of said deforming agency.*

*97. Apparatus as in claim 96, wherein:*

*d. said motive means is endless.*

* * * * *

UNITED STATES PATENT OFFICE
CERTIFICATE OF CORRECTION

Patent No. RE 28,795 Dated May 4, 1976

Inventor(s) FRANCIS JOSEPH FUCHS, JR.

It is certified that error appears in the above-identified patent and that said Letters Patent are hereby corrected as shown below:

In the specification, column 6, line 51, "guadrants" should read --quadrants--. Column 9, line 63, "effort" should read --effect--. Column 10, line 10, "are" should read --art--; line 25, "normal" should read --nominal--; line 64, "production" should read --product--.

In the claims, claim 1, column 10, line 67, "of" should read --for--. Column 11, claim 2, line 39, "same" should read --said--; same claim, line 43, "[agency]" should read --[agency.]. Column 12, claim 4, line 23, "suchc" should read --such--; claim 6, lines 59-60, "conti-nously" should read --continuously--. Column 14, claim 11, line 19, "," should read --;--. Column 17, claim 37, line 36, "frist" should read --first--. Column 18, claim 39, line 61, "surface" should read --surfaces--. Column 19, claim 40, lines 39-40, "the entire perimeter of the elongated surface of the elongated workpiece" should not be in italics; same claim, line 40, "to" should read --[to]--; claim 41, line 48, "wherein" should read --wherein:--. Column 23, claim 71, line 25, "relation" should read --station--. Column 25, claim 84, line 68, "and" should read --; and--. Column 26, claim 85, line 31, "and" should read --; and--; claim 87, line 68, "force against said deforming agency" should read --force--. Column 27, claim 88, line 23, "and" should read --; and--; claim 89, line 53, "and" should read --; and--. Column 29, claim 94, line 27, "a deforming" should read --a. a deforming--.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*